United States Patent [19]
Fujii et al.

[11] Patent Number: 4,890,586
[45] Date of Patent: Jan. 2, 1990

[54] INTAKE DEVICE FOR AN INTERNAL COMBUSTION ENGINE

[75] Inventors: Takaaki Fujii; Seishi Miura, both of Saitama; Takaaki Tsukui, Tokyo, all of Japan

[73] Assignee: Honda Giken Kogyo Kabushiki Kaisha, Tokyo, Japan

[21] Appl. No.: 177,447

[22] Filed: Apr. 4, 1988

Related U.S. Application Data

[63] Continuation-in-part of Ser. No. 81,133, Aug. 3, 1987, Pat. No. 4,759,320.

[30] Foreign Application Priority Data

| Aug. 6, 1986 [JP] | Japan | 61-185616 |
| Dec. 28, 1986 [JP] | Japan | 61-309961 |
| May 14, 1987 [JP] | Japan | 62-117966 |
| May 14, 1987 [JP] | Japan | 62-117967 |

[51] Int. Cl.$^4$ .............................................. F02B 75/18
[52] U.S. Cl. ............................. 123/52 M; 123/52 MB
[58] Field of Search ......... 123/52 M, 52 MB, 52 MC, 123/52 MV, 188 M, 432

[56] References Cited

U.S. PATENT DOCUMENTS

| 3,875,918 | 4/1975 | Loynd | 123/52 M |
| 4,494,493 | 1/1985 | Morikawa et al. | 123/52 M |
| 4,497,286 | 2/1985 | Masuda | 123/52 M |
| 4,543,918 | 10/1985 | Ma | 123/52 MB |
| 4,545,331 | 10/1985 | Ito et al. | 123/52 M |
| 4,546,733 | 10/1985 | Fukami et al. | 123/52 MB |
| 4,565,166 | 1/1986 | Takeda | 123/52 MB |
| 4,574,748 | 3/1986 | Inoue et al. | 123/52 MB |
| 4,617,897 | 10/1986 | Sasaki et al. | 123/188 M |
| 4,664,076 | 5/1987 | Miyano et al. | 123/52 MB |
| 4,765,285 | 8/1988 | Kobayashi | 123/52 MB |

FOREIGN PATENT DOCUMENTS

59-21392  1/1984  Japan ............................. 123/52 MB

Primary Examiner—David A. Okonsky
Attorney, Agent, or Firm—Birch, Stewart, Kolasch & Birch

[57] ABSTRACT

An intake system for an internal combustion engine includes a variable length intake tract having a moveable intake pipe which selectively abuts a fixed intake pipe. During high speed operation, the moveable intake pipe is separated from the fixed intake pipe to provide a relatively short intake pipe length while in low speed operation, the moveable intake pipe abuts the fixed intake pipe so that a longer intake tract is formed. The influence of positive pressure waves on the air/fuel ratio during low speed operation is reduced by air flow resistance control means which increases the resistance of the intake system during low speed operation. This may be accomplished by use of an induction housing having a high speed chamber receiving the outlet of the fixed intake pipe and a low speed chamber receiving the outlet of the intake system when in the low speed intake mode, the low speed chamber having an intake opening having a higher air flow resistance than that of the opening of the high speed chamber. The intake system when used in a multi-cylinder engine may drive the moveable intake pipes of differing cylinders so that the transient shifting of the moveable intake pipe between the low speed mode and the high speed mode occurs at slightly different times for differing cylinders reducing the power droppage at any instant in time for the overall engine.

35 Claims, 27 Drawing Sheets

FIG. 23
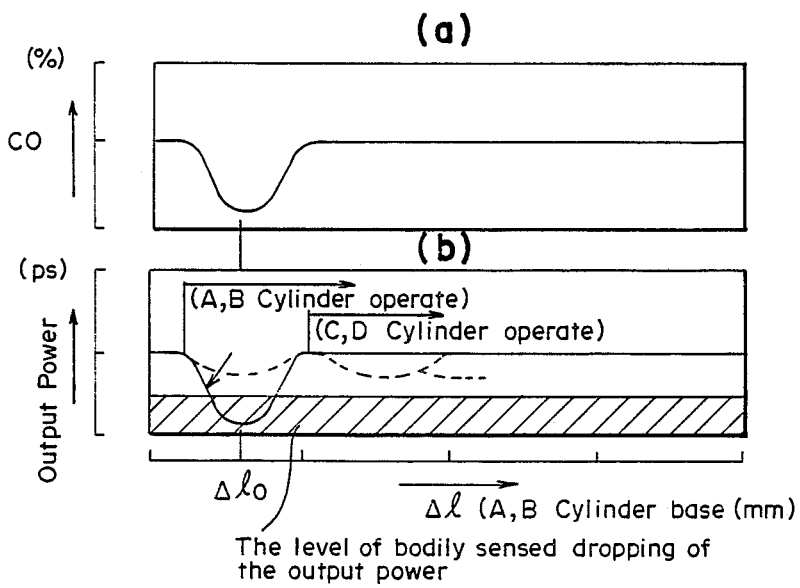
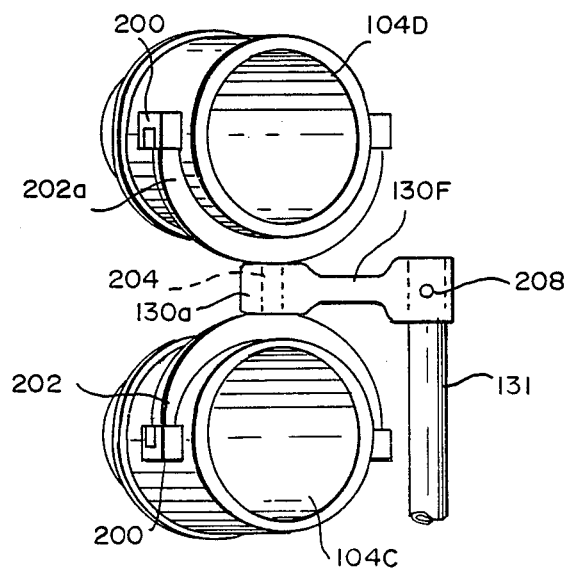
FIG. 26

INTAKE DEVICE FOR AN INTERNAL COMBUSTION ENGINE

The present application is a continuation-in-part of application Ser. No. 081,133 entitled "Intake Device for an Internal Combustion Engine" which was filed on Aug. 3, 1987 and is now U.S. Pat. No. 4,759,320.

The present invention generally relates to an intake device for an internal combustion engine and more particularly to an intake device having a variable intake pipe length mechanism and/or an intake vacuum adjusting means which is particularly adapted for internal combustion engines having one or more cylinders mounted in motorcycles and the like.

DESCRIPTION OF THE PRIOR ART

It is known that an internal combustion engine having one or more cylinders may be provided with a variable intake pipe length mechanism to vary the intake pipe length. Such a variable length intake pipe mechanism may be adjusted so that the effective length of the intake pipe may be increased when the rotational speed of the internal combustion engine is low and decreased when the rotational speed of the engine is high. Such a mechanism has been combined with a variable fuel control type carburetor as illustrated in laid open Japanese patent application no. SHO.61-49124. A better understanding of such a prior art device and the effects and functions of the use of a variable pipe length mechanism and its effect on the air/fuel ratio may be best explained with reference to FIGS. 18–21.

FIG. 18 illustrates two performance curves representing the relation between engine speed and the power generated by the engine. A first curve illustrates this relationship where the engine is provided with a combination of a long intake pipe and an optimum carburetor A (combination A) and a second curve illustrates the relationship where the engine is provided with a combination of a short intake pipe and an optimum carburetor B (combination B). These curves cross at a specific engine speed Nex. Assuming that this crossing point, Nex, is used as a boundary point, ideal performance may be achieved if the engine is operated in a low speed zone from zero to the boundary point Nex with combination A and in a high speed zone above the boundary point Nex with combination B.

FIG. 19 illustrates the relationship between engine speed and necessary flow volume for the combination A, while FIG. 20 illustrates the relationship between engine speed and necessary flow volume for combination B. In these figures, the straight line I represents the optimum air/fuel ratio for operation of an internal combustion engine regardless of intake pipe length.

When a single carburetor, for example, the carburetor B, is used for executing combustion control, the performance curve C illustrated in FIG. 21 is plotted. This curve C is identified with the line I in the high speed range above boundary point Nex. Curve C is shifted to the lean side below the line I in the low speed range. Thus, an engine provided with only a variable intake pipe length mechanism is unable to optimize the mixture for every driving condition.

In order to compensate for this, the engine may be further provided with a variable fuel adjusting type carburetor so as to enrich the air/fuel ratio. However, such a variable fuel adjusting type carburetor requires a complicated structure and results in a time delay in the generation of the compensating effect after switching a fuel control device such as a main jet to adjust its air/fuel ratio.

As the intake pipe length is increased, the inertia effect is enlarged and a remarkable pulsating wave of air flow is generated in the intake pipe. FIG. 22 illustrates the influence of the pulsating wave applied to main nozzle N of the carburetor. As an intake valve V opens or closes the intake IN alternately, a pulsating wave alternates between vacuum and positive pressure as seen by the main nozzle N. The total area of the negative pulsating wave is represented by $\Sigma M$ and the total area of the positive pulsating wave is represented by $\Sigma P$. Fuel may be smoothly drawn out of the main nozzle N as long as the difference between these areas is kept within the following condition.

$$\Sigma P - \Sigma M < 0 \quad (\Sigma P \text{ and } \Sigma M \text{ are absolute values}). \tag{1}$$

However, the fuel quantity drawn from the main jet is decreased as the difference approaches zero, so that the air/fuel ratio fluctuates.

A system wherein variable length induction pipes are provided on the upstream sides of carburetors of a multi-cylinder internal combustion engine is already known. Such a variable length induction pipe is adjusted such that the length thereof may be increased when the rotational speed of the internal combustion engine is low and decreased when the rotational speed is high. An exemplary one of such systems is disclosed in Japanese Patent Laid-Open No. 61-49124.

A system where the breathing resistance is changed simultaneously with the change of the induction pipe length to effect correction of the air/fuel ratio to eliminate influence of positive pulsewaves accompanying an increase in the effect of inertia when the pipe length is great has been proposed by the assignee of the present application in Japanese laid open patent publication no. 62-56174.

If a certain spacing $\Delta l$ is formed between a moveable intake pipe or slide valve and a fixed intake pipe during the movement of the slide valve away from the fixed intake pipe, the air/fuel ratio may become temporarily lean and the output power may drop as illustrated in FIGS. 23($a$) and 23($b$). FIG. 23($a$) is a graph illustrating the disruption of the fuel mixture in relation to the amount of sliding movement of a slide valve while FIG. 23($b$) illustrates the output power with respect to displacement in a four cylinder internal combustion engine employing four slide valves operated simultaneously. The dotted line in FIG. 23($b$) illustrates the degree of drop of the output power of such a four cylinder internal combustion engine when the slide valves are differentially opened in respective cylinder pairs according to the teachings of one embodiment of the present invention.

The power drop phenomenon is a transient one which accompanies the changing of the pipe length. When the slide valve is connected to the fixed suction pipe so that the difference $\Delta l$ is reduced to zero, an improved fuel condition is obtained by raising the negative pressure level (absolute value of the negative pressure) applied to a main nozzle of a carburetor to prevent impairment of the discharge of fuel by the carburetor due to intense pulsewaves applied to the main nozzle of the carburetor which are caused by the accompanying increase of the length of the induction pipe. Further, if $\Delta l$ exceeds a certain value, the clearance is expanded to a predetermined dimension so that the pulsewaves and the negative pressure level applied to the main nozzle become equal to those which occur at a time when the length of the suction pipe is small, and thus, the fuel condition is stabilized. However, when the value of $\Delta l$ is equal to $\Delta l_0$, the rise in negative pressure becomes insufficient to compensate for the pulsewaves applied to the main nozzle of the carburetor and thus the fuel condition becomes lean. The range in which such a low fuel condition as described above appears may vary and is illustrated in this figure by way of example only. Such a range varies depending upon the specifications of the various portions of the induction system and engine construction.

SUMMARY OF THE INVENTION

It is an object of the present invention to compensate for variations in the air/fuel mixture when the intake tract length is varied.

It is another object of the present invention to provide the above mentioned compensation without use of a variable fuel adjusting type carburetor or the like.

It is a further object of the present invention to provide an intake device for an internal combustion engine with a relatively simple structure which can compensate for the pulsating wave generated by variation in the intake pipe length developed by a variable intake pipe length mechanism.

It is a still further object of the present invention to provide an induction system for an internal combustion engine having variable length induction pipes wherein the breathing resistance of the induction path is changed to adjust the negative pressure level applied to main nozzles of one or more carburetors to stabilize fluctuations of the air/fuel ratio and simultaneously reduce a temporary drop of the output power due to changing of the pipe length.

It is a still further object of the present invention to provide an induction system for an internal combustion engine having a variable length induction pipe wherein the negative pressure level applied to a main nozzle of a carburetor is adjusted to stabilize the fluctuation in the air/fuel ratio by changing the induction path to one of differing restriction through the movement of the moveable intake pipe of the variable intake pipe length mechanism.

It is a further object of the present invention to reduce the amount of power drop caused by the variable intake pipe length mechanism during transient movement of the moveable intake pipe by varying the timing of the moveable intake pipe between cylinders to reduce the total power drop at any instant in time.

It is a still further object of the present invention to reduce the severity of the power drop caused by the variable length mechanism during transient movement of the moveable intake pipe by providing slits in the moveable intake pipe and guide pipe to enhance airflow during this transient movement.

To accomplish the above mentioned objects, the intake device for an internal combustion engine according to the present invention employs a variable intake pipe length mechanism including a stationary intake pipe connected to a carburetor, a guide pipe separated from the stationary intake pipe, and a moveable intake pipe slidably mounted on the guide pipe so as to be selectively slid into abutment with the stationary intake pipe to vary the effective intake pipe length. The moveable intake pipe is connected to the stationary intake pipe below a predetermined engine speed and separated from it above this predetermined speed. According to the teachings of the present application, a case enclosing the stationary intake pipe, moveable intake pipe and guide pipe is provided with an intake passage integrally formed therewith to communicate with the atmosphere. A vacuum pressure adjusting means varies the air flow resistance of the intake passage in response to the switching motion of the moveable intake pipe according to one embodiment of the present invention.

According to an alternative embodiment, the housing is provided with first and second chambers, a first chamber communicating with the stationary intake pipe when the moveable intake pipe is separated therefrom to provide a relatively low breathing resistance while a second chamber communicates with the output of the moveable intake pipe when abutting the stationary intake pipe to provide a chamber of relatively higher breathing resistance. When the rotational speed of the internal combustion chamber is lower than a predetermined value, the moveable intake pipe is connected to the stationary intake pipe, the moveable intake pipe being separated from the stationary intake pipe when the rotational speed is higher than a predetermined value. Through the provision of the first and second chambers, the breathing resistance is changed in cooperation with the shifting of the moveable intake pipe.

According to the teachings of another embodiment, the moveable intake pipes for differing cylinders of a multicylinder internal combustion engine are individually actuated so that the operating timings of the individual moveable intake pipes do not coincide with one another, thereby attenuating any power droppage or intake mixture disruption during transient movement of the moveable intake pipe by spreading such disruption through differing engine revolution speeds.

According to still another embodiment of the present invention, each moveable intake pipe or slide valve and its corresponding guide pipe is provided with one or more slits formed therein. The slits are arranged so that, during an intermediate location of the moveable intake pipe between the position separated from the fixed intake pipe and the position in abutment to the fixed intake pipe, a gap is formed at an intermediate portion of the movement of the moveable intake pipe so as to reduce the duration of any power drop caused by partial movement of the moveable intake pipe.

The above mentioned objects and features of the present invention claimed in the appended claims will become more obvious upon a study of the preferred embodiments described hereinbelow and illustrated in the attached drawing sheets.

BRIEF DESCRIPTION OF THE DRAWINGS

FIG. 23 (a) and 23 (b) are graphic representations of the relationship between a fuel condition in the output power of an internal combustion engine in relationship to the gap between a moveable intake pipe or slide valve and a fixed intake pipe.

FIG. 26 is an illustration of a portion of the preferred embodiment of FIG. 24.

The preferred embodiments of the present invention as illustrated in the above mentioned drawings may be better understood with reference to the detailed description presented hereinbelow which will better explain the preferred embodiments of the present invention with reference to the above mentioned drawings.

DETAILED DESCRIPTION OF THE PREFERRED EMBODIMENTS

Figure 21:
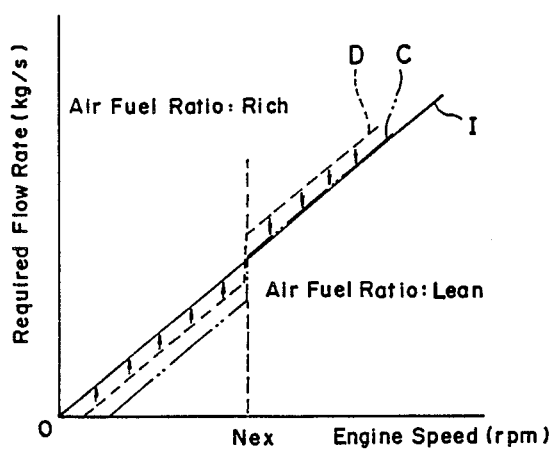
FIG. 21 is a graph showing the relationship between variable intake pipe length for a short intake pipe in the required air flow rate.

The theory of operation of the intake device of the present invention will first be described with reference to FIGS. 21 and 22.

In contrast to the operation of conventional devices as described in the Background of the Invention section of the present application, according to the teachings of the present invention, when the carburetor B as discussed in the Background of the Invention section is controlled so as to develop the air/fuel ratio of line C in FIG. 21, the air/fuel ratio is conventionally shifted to the lean range during low speed operation below the boundary point Nex as illustrated by line D, even when the intake pipe length is extended by the variable intake pipe length mechanism. Such a long intake pipe increases the inertia effect and generates severe pulsating waves as illustrated in FIG. 22. As the engine speed is shifted into the low speed zone from the boundary point Nex, the air flow resistance in the intake pipe is increased by the air flow resistance adjusting means in cooperation with the shifting operation for extending the intake pipe length. The increase in air flow resistance increases the vacuum pressure level at the main nozzle N of the carburetor (the absolute value is increased) and the reference level is shifted to the positive range as is represented by the phantom line in FIG. 22. Accordingly, the air/fuel ratio is shifted in the direction represented by the arrows of FIG. 21 so as to coincide line D with line I, the optimum fuel/air mixture. Thus, the air/fuel ratio is enriched to compensate for variation in the intake tract length.

The main nozzle N of the carburetor quickly senses the change in flow resistance and thus corrects the air/fuel ratio quickly to provide good compensation response. Even when the magnitude of the pulsating wave applied to the main nozzle increases, the formula ($\Sigma P - \Sigma M$) is maintained in the negative range and thus the fuel is correctly drawn from the main nozzle N.

In the high speed zone above the boundary point Nex, the moveable intake pipe is shifted in the opposite direction to isolate the stationary intake pipe from the moveable intake pipe and guide pipe. Thus, the effective pipe length is decreased and the air flow resistance is simultaneously decreased in response to the above motion. In accordance with this operation, the line D is shifted to the line I to provide compensation to optimize the air/fuel ratio. When speed is again reduced, and a long effective intake pipe length is provided to the carburetor, the adjusting operation again increases air flow resistance as described above.

Figure 1:
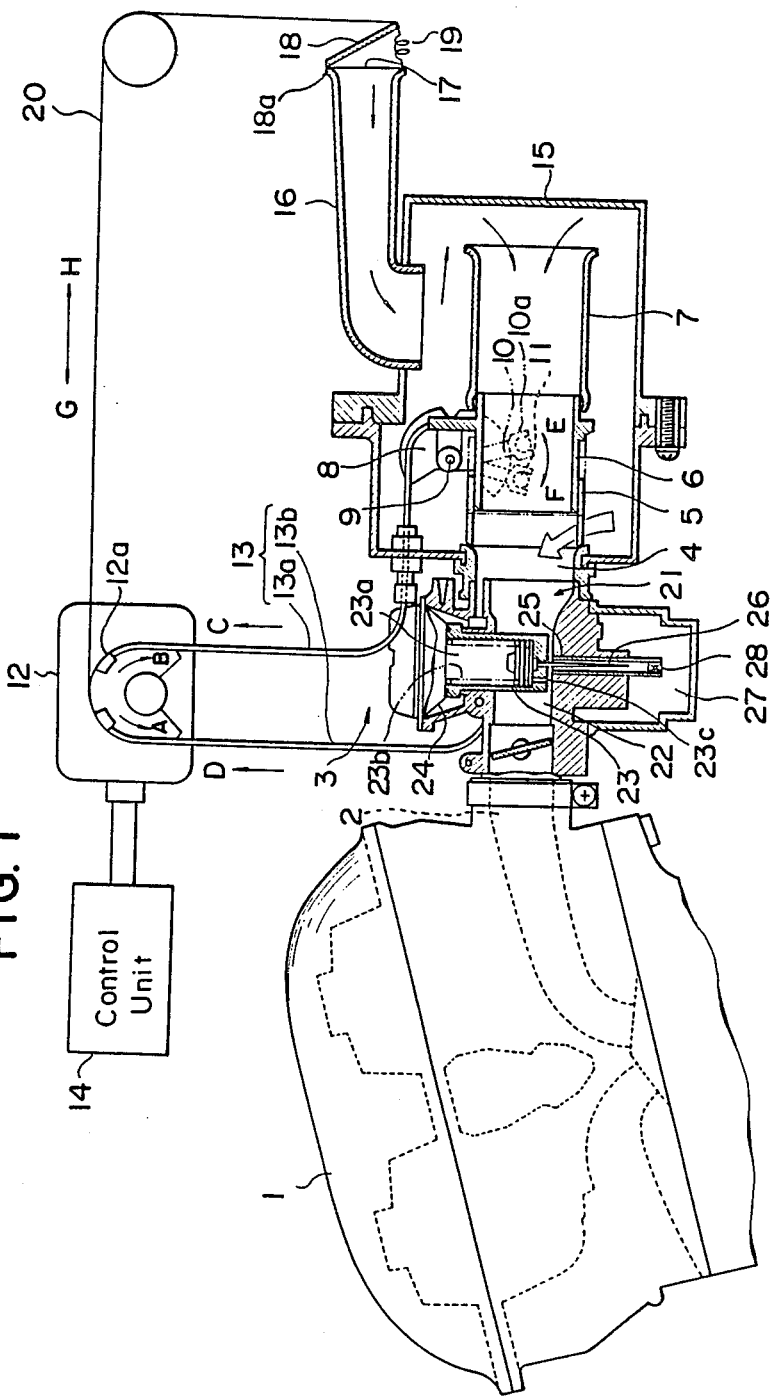
FIG. 1 is a schematic illustration illustrating a first embodiment of the intake device for an internal combustion engine according to the teachings of the present invention.
Figure 2:
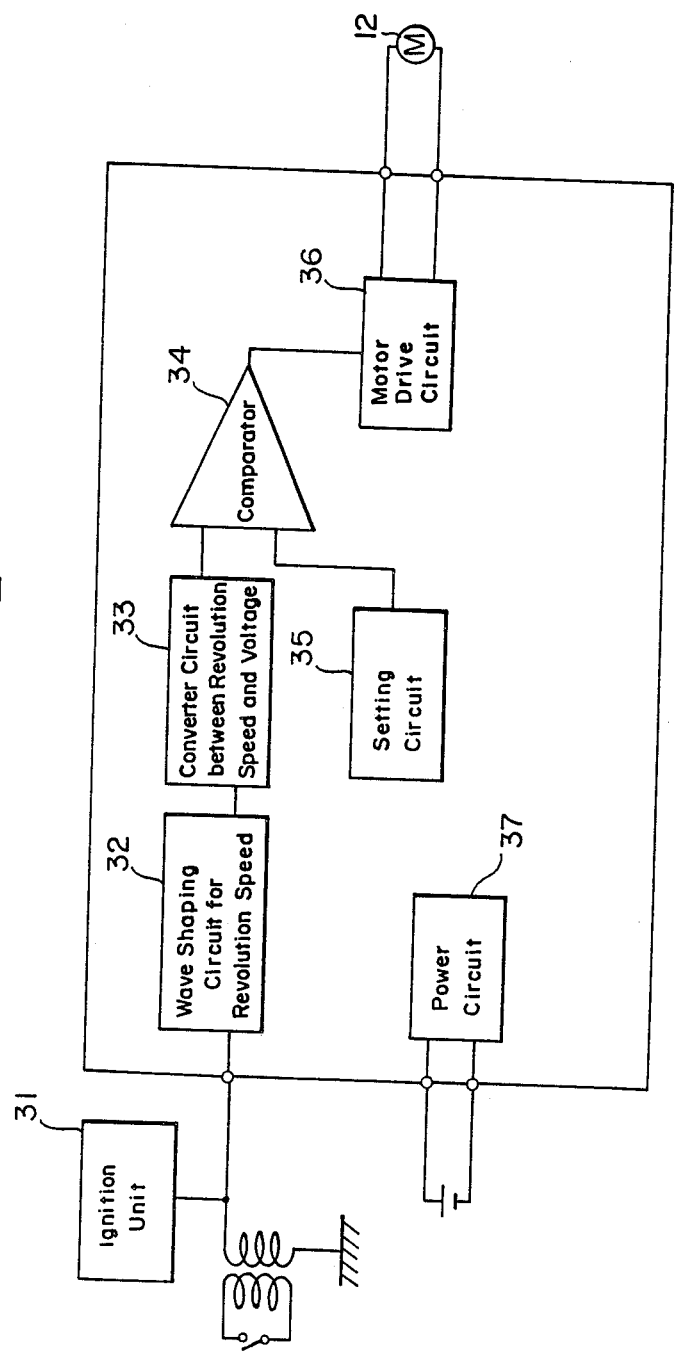
FIG. 2 is a block diagram demonstrating the electronic control utilized for the variable intake pipe mechanism and air flow resistance adjusting means illustrated with respect to FIG. 1.

FIG. 1 and FIG. 2 illustrate a preferred embodiment according to the teachings of the present invention. The preferred embodiment of the present intake device is utilized in an internal combustion engine to be mounted in a motorcycle. The intake device is provided with a variable intake pipe mechanism and a variable throttle mechanism which is one example of an air flow resistance adjusting means.

FIG. 1 is a section illustrating the intake device system of the first preferred embodiment. An internal combustion engine 1 is provided with an intake port 2 to which a carburetor 3 is connected. A variable intake pipe length mechanism is located upstream of the carburetor 3. The variable intake pipe length mechanism includes a stationary intake pipe 4, a moveable intake pipe 5 and a guide pipe 6. The stationary intake pipe 4 is fixedly connected to the upstream opening of the carburetor 3. The moveable intake pipe 5 is slidably mounted along a fixed guide pipe 6 which constrains the movement of the moveable intake pipe 5. In this preferred embodiment of the present invention, the moveable intake pipe or slide valve 5 slides about the outside of the guide pipe 6. The upstream end of the guide pipe 6 is provided with a horn 7. The moveable intake pipe 5 can be selectively shifted between the first position which is represented by the solid lines where it contacts with the open end of the stationary pipe 4 and to provide a relatively long effective intake tract length and a second position represented by the phantom line where it is isolated from the intake pipe 4 to provide a relatively short intake tract length.

An actuating mechanism for adjustably shifting the moveable intake pipe 5 includes a rotatable drum 8 fixably mounted on a rotatable shaft 9 which is pivotally mounted on guide pipe 6. A connecting lever 10 is integrally fixed to the rotating shaft 9 and drum 8, and is provided with a U-shaped end section 10A. An engageable projection 11 projecting from the side portion of the moveable intake pipe 5 is engaged by the U-shaped end section 10A of the connecting lever 10 to facilitate shifting of the moveable intake pipe 5 upon rotation of the rotatable drum 8. A servo motor 12 causes rotation of a servo motor rotating crank 12A to translate a wire or cable 13 connecting the servo motor 12 to the rotatable drum 8 for actuation of the moveable intake pipe 5. The wire or cable 13 is composed of a pair of wires 13A and 13B. Wire 13A is connected to one side of the rotatable drum 8 while wire 13B is connected to another side of the rotatable drum 8. Accordingly, the wire 13A may be selectively pulled by the servo motor 12 to rotate the rotatable shaft 9 in one direction while the wire 13B is selectively pulled by the servo motor 12 to rotate the rotatable shaft 9 in the reverse direction. The servo motor 12 is operated by a control unit 14 which is described in greater detail with reference to FIG. 2.

The variable intake pipe mechanism comprising the stationary intake pipe 4, moveable intake pipe 5, guide pipe 6 and horn 7 is housed in an air cleaner case 15. The case 15 is further provided with an air duct 16 for introducing ambient air to the throat of the carburetor 3. The air duct 16 is provided with an open end 17 at the upstream end thereof, having a shutter 18 mounted thereon. The shutter 18 is pivotally mounted on the open end 17 of the air duct 16 by a pivotal means such as a hinge 18A. A return spring 19 is interposed between the shutter 18 and the open end 17 of the air duct 16, so that the shutter 18 is normally biased in the closing direction. One end of a wire or cable 20 is fixed to the shutter 18 and the other end is fixed to the servo motor rotating crank 12A. Thus, the shutter 18, return spring 19, the wire or cable 20 and the servo motor 12 collectively form a variable throttle mechanism which functions as air flow resistance adjustment means.

In the preferred embodiment, the carburetor 3 is of the well known variable venturi type employing a piston valve. In this type of carburetor, as illustrated in FIG. 1, a piston valve 23 is slidably arranged in the venturi section 22 formed in the intake passage 21 of the carburetor 3. The piston valve 23 is formed of a cylindrical shape whose inner space is used as a vacuum chamber 23A in which a spring 23B is elastically mounted. In this type of carburetor, the piston valve 23 is biased downwards by the spring 23B. The vacuum chamber 23A communicates with the venturi section 22 through a bleed hole 23C which is formed in the bottom of the piston valve 23. The vacuum chamber is defined in part by diaphragm 24 connected to the upper section of the piston valve 23. The outside chamber of the diaphragm 24 is connected with the upstream end of the intake passage 21 through an additional communicating hole (not shown in this figure).

Under the piston valve 23, a main nozzle 25 is provided within the venturi section 22. The main nozzle 25 contains a needle jet 26 positioned so as to move with the piston valve 23 in the vertical direction in FIG. 1. The lower end of the main nozzle 25 protrudes into a float chamber 27 and the main jet 28 is set in this chamber 27. The float chamber 27 contains fuel to be metered to the engine 1.

FIG. 2 is a block diagram of the electronic control circuit employed in the control unit 14. A revolution signal indicative of the speed of the engine is generated from the ignition unit 31 and is converted to a voltage representative of the rotational speed of the engine by a wave shaping circuit for developing a rotation speed signal 32 and a converter circuit 33 for developing a voltage representative of a rotational speed. A setting circuit 35 develops a comparison voltage to provide to a comparator 34 for comparison with the voltage indicative of engine speed developed by the converter 33. When the engine speed reaches a predetermined value, for example, 9700 rpm, the comparator 34 develops a positive output signal. When the engine rotational speed is below this predetermined value, the output of the comparator 34 is of an opposite voltage polarity. In response to the output of the comparator 34, the motor drive circuit 36 drives the servo motor 12 to shift the variable intake pipe length mechanism to locate the moveable intake pipe 5 either in abutment with the stationary intake pipe 4 at high speeds, or isolated therefrom at low speeds.

The operation of the preferred embodiment of FIGS. 1 and 2 may be best understood with reference to these figures. During low speed running, the stationary intake pipe 4 is tightly connected to the moveable intake pipe 5 so that the intake pipe length is extended to the length of the combination of the stationary intake pipe 4, moveable intake pipe 5, the guide pipe 6, and the horn 7, together. Air within the air cleaner case 15 is introduced and supplied to the venturi section 22 from the end of the horn as shown in the arrow represented by the solid line. The volumetric efficiency at low speed is thus improved due to the pulsation effect and the inertia effect derived from the long intake pipe. Under this condition, the shutter 18 is kept in the full throttled state to minimize the cross sectional area of the intake passage at the open end 17 of the air duct 16. Thus, the main nozzle 25 facing the venturi section 22 is subjected to increased vacuum so that fuel is continuously and stably supplied to the engine even though the pulsating wave applied to the venturi section 22 is high.

Under the high speed running condition, when the engine reaches a predetermined engine speed, the comparator of the control unit 14 generates an output signal to cause the servo motor 12 to reverse directions. This results in the switching of the intake pipe length into the high speed running state. The signal from the control unit 14 rotates the servo motor 12 a predetermined amount in the direction represented by the arrow A and the wire 13A is pulled in the direction represented by the arrow C. The rotatable drum 8 and the shaft 9 are thus simultaneously rotated so that the connecting element 10 rigidly fastened to the shaft 9 is rotated in the direction represented by the arrow E. Accordingly, the engageable projection 11 is rotated to the right in the drawing together with the connecting element 10 and the moveable intake pipe 5 is moved away from the intake of the carburetor 3. An opening appears between the stationary intake pipe 4 and the moveable intake pipe 5 and the air within the air cleaner case 15 is introduced through the opening as shown by the dashed white arrows and flows towards the venturi section 22 through the stationary intake pipe 4. Simultaneously, the wire 20 is pulled to the direction represented by the arrow G by the rotating force of the servo motor 12 and the shutter 18 is fully open. The air flow resistance is thus decreased so that a large quantity of air can be introduced into the air cleaner case 15. This allows the large quantity of air to be introduced through the short intake pipe at a high velocity in the air/fuel mixture is introduced into the internal combustion engine with a high volumetric efficiency to develop the proper combustion for the high speed running condition.

Thereafter, as the engine speed is decreased and falls to the predetermined value, the system shifts from the high speed mode to the low speed mode with the comparator output changing states to cause the motor drive circuit to drive the motor in the reverse direction to switch the intake pipe length to the low speed mode. In detail, the servo motor 12 rotates in the direction represented by the arrow B in response to the signal of the control unit 14. The wire 13B is pulled in the direction represented by the arrow D and thus the rotatable drum 8, shaft 9, and connecting element 10 are rotated in the direction represented by the arrow F. The moveable intake pipe moves toward abutment with the stationary intake pipe 4. Under this condition, tension on the wire 20 is loosened so that the wire is moved in the direction represented by the arrow H and the shutter 18 is throttled to a predetermined closed amount by the biased force of the return spring 19. This causes the intake pipe length to be lengthened for the low speed running mode in which the pulsation effect and the inertia effect can be utilized. It can therefore be seen that, in accordance with the driving condition of the engine 1, the control unit 14 is actuated in response to the revolving speed signal and thus the intake pipe length and the throttle opening degree are automatically adjusted.

According to this preferred embodiment, although the intake pipe length is extended, the area of the intake passage is decreased and the absolute value of the vacuum pressure is increased by means of the variable throttle mechanism in cooperation with the variable intake pipe length mechanism. This reduces the effect of the pulsating wave on the air/fuel mixing section so that the mixture is not made undesirably lean. Even if the engine speed varies during the low speed running mode, the fluctuation of the air/fuel ratio will be kept within the desired range. Therefore, a severe problem is overcome which may not be overcome by only using the variable fuel adjusting carburetor.

Figure 22:
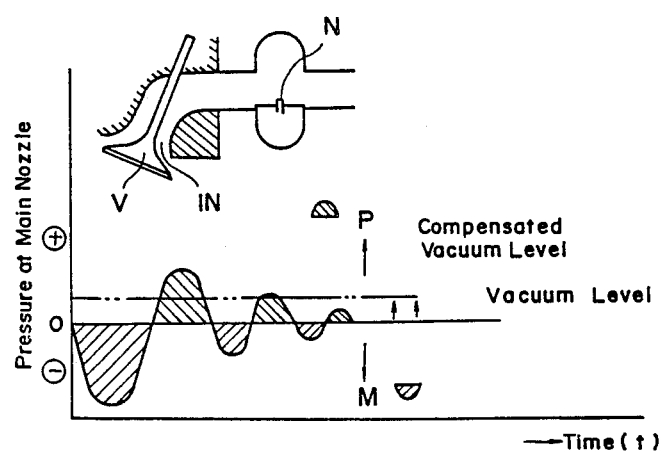
FIG. 22 is a graph showing the relationship between pulsation within the intake tract and vacuum pressure level.

Specifically, the fuel injection from the main nozzle is pulsatingly fluctuated as the venturi section 22 is subjected to the positive or negative pulsating waves, as illustrated in FIG. 22, so that the injection is not continuously executed. According to this fact, the air/fuel ratio is also fluctuated in response to the change of engine speed.

The system of the preferred embodiment can resolve these problems and keep the output performance and the air/fuel ratio stable over the entire range of engine speeds. Further, the vacuum pressure adjusted by the shutter 18 instantaneously affects the venturi section 22. This improves the response characteristics in comparison with the conventional variable fuel adjustment mechanism which adjusts the air/fuel ratio by the quantity of the fuel injection in response to the opening degree of the main jet. In addition to these advantages, this system can keep the air/fuel ratio adapted to a wide range of engine speeds by only setting the carburetor at the high speed running mode. Thus, the system according to the teachings of the present invention does not require the known variable fuel adjusting type carburetor to maintain correct mixture.

From a cost viewpoint, the construction cost of the system of the present invention is considerably lessened over that of prior systems as the combination of the variable intake pipe length mechanism and the variable throttle adjusting mechanism is significantly less to that of the combination of a variable pipe length mechanism and a variable fuel adjusting mechanism.

Further, in this first preferred embodiment, the air cleaner case which has been previously arranged upstream of the carburetor as a necessary element is utilized as the case for the device of the present invention, resulting in a resultingly simplified structure.

In the present invention, the variable intake pipe length mechanism is not limited to the configuration shown by this first illustrated preferred embodiment. For example, the shutter 18 may be varied in its configuration, operating mechanism and fitting position. For example, the shutter 18 may be mounted at the open end of the duct 16 within the air cleaner case 15. This arrangement may be utilized in the other embodiments of the present invention.

Figure 3:
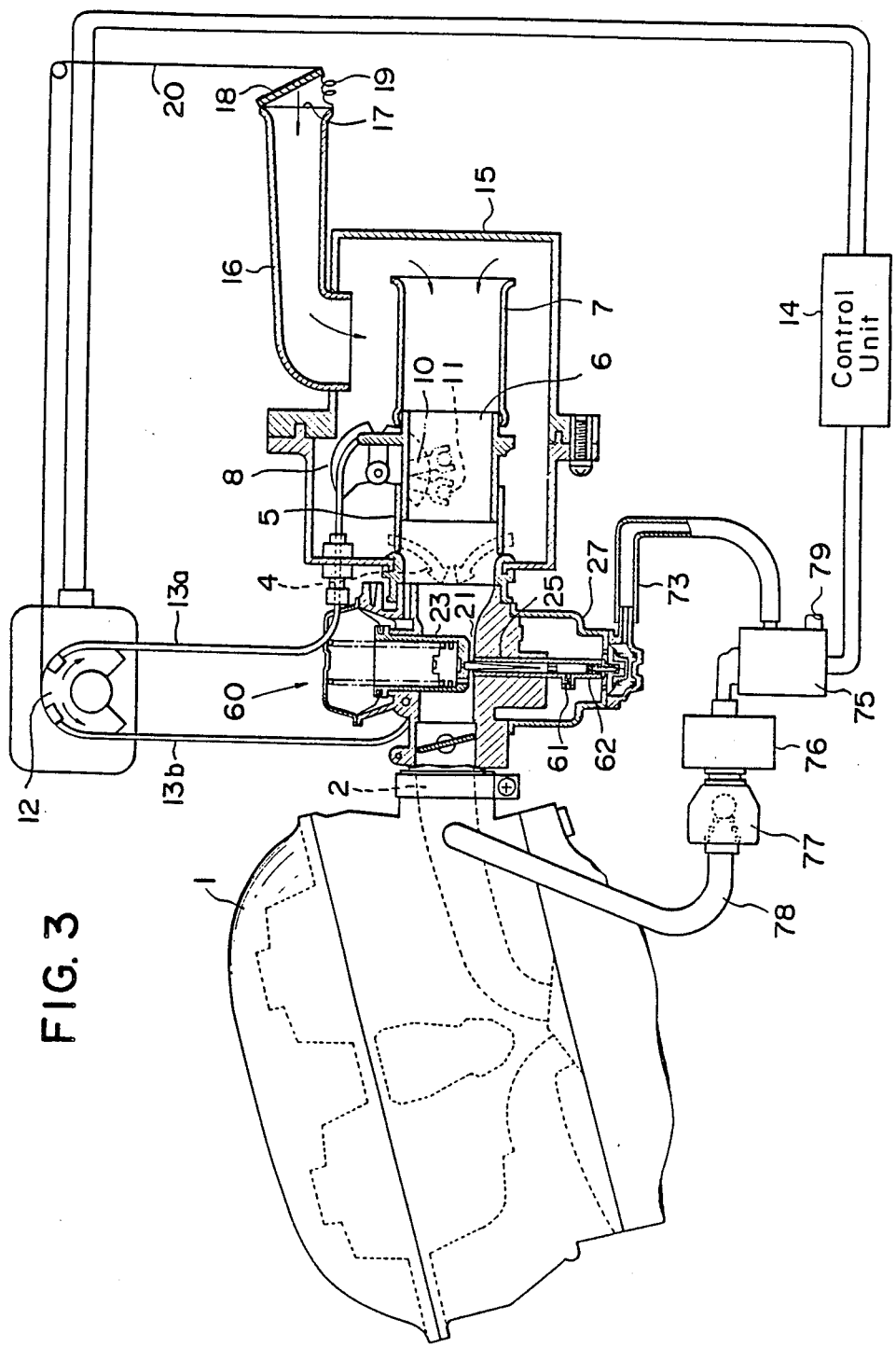
FIG. 3 is a schematic illustration showing a second embodiment of an intake device for an internal combustion engine according to the teachings of the present application.
Figure 4:
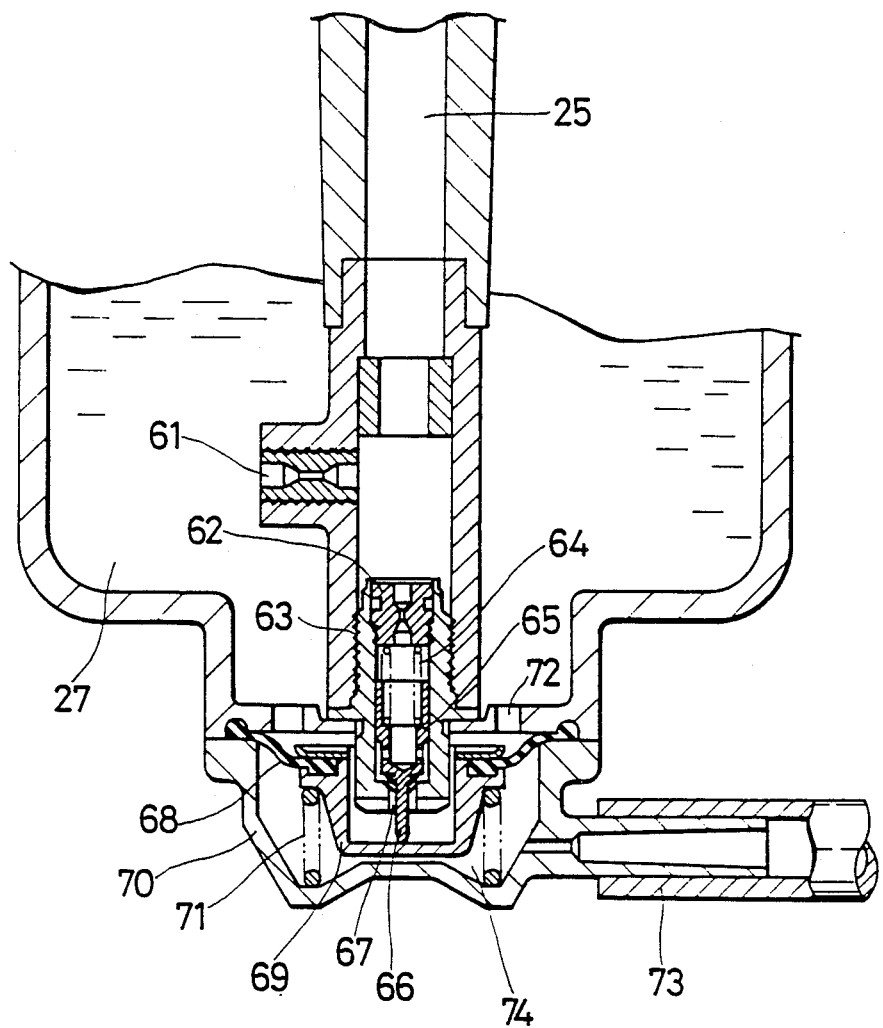
FIG. 4 is an enlarged sectional view illustrating an essential component employed in the second embodiment of FIG. 3.
Figure 5:
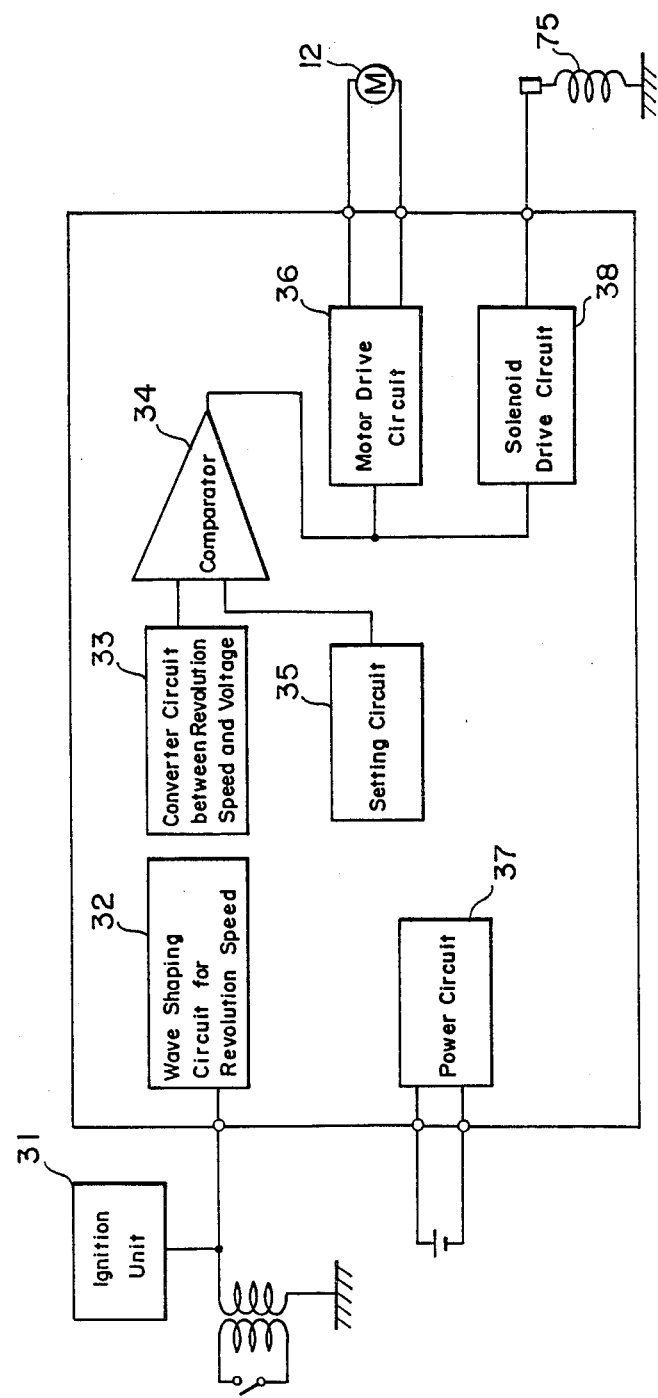
FIG. 5 is a block diagram illustrating the electronic control for the variable intake pipe length mechanism and air flow resistance adjusting means of the intake device illustrated in FIG. 3.

FIGS. 3-5 illustrate a second preferred embodiment of the intake device according to the present invention which, in the preferred embodiment, is designed to be utilized in a motorcycle. This second embodiment is identical to the structure of the first preferred embodiment except for the addition of a variable fuel adjusting mechanism which may be utilized in combination with the teachings of the present invention. In these drawings as in the remainder of the present application, like numerals denote the same parts or corresponding elements in the various figures. Accordingly, those elements already explained will not be explained again.

FIG. 4 illustrates the detailed construction of a carburetor to be utilized in the FIG. 3 intake system. This intake system has a variable intake pipe length mechanism as explained with respect to FIG. 1, a variable throttle mechanism is also explained with respect to FIG. 1, and a variable fuel adjusting type carburetor provided with a variable fuel adjustment mechanism. In detail, a variable fuel adjusting type carburetor 60 is connected to the intake port 2 of the internal combustion engine 1 and is otherwise identical to the variable venturi type carburetor 3 of FIG. 1, except for the addition of the variable fuel adjusting mechanism. This mechanism is arranged at the bottom of the main nozzle 25 in the float chamber 27.

At the bottom of the main nozzle 25, a first main jet 61 and a second main jet 62 are arranged. The first main jet 61 is provided in direct communication with the fuel so as to supply a constant flow of fuel therethrough. The second main jet 62, however, is fitted on the upper end of a holder 63 which is inserted into the tip end of the main nozzle 25. A valve mechanism is set in the lower section of the holder 63 and fuel may be supplied through the second main jet 62 only when the valve is open. A needle valve 65 is housed in a holder 63 under the second main jet 62 and is biased by a needle spring 64 so as to move longitudinally. A tip end projection 66 of the needle valve 65 is biased so as to protrude downwardly through the opening 67 formed in the bottom of the second main jet 62. A cup 69 having a diaphragm 68 is arranged in the bottom of the float chamber 27 so as to cover the end of the second main jet 62 and the tip end projection 66 contacts the bottom surface of the cup 69. A return spring 71 is elastically arranged between the cup 69 and its housing 70 so that the cup 69 is biased upwardly by this return spring 71. Since the elastic force of the return spring 71 is stronger than that of the needle spring 64, the needle valve 65 is normally pressed upwardly to prevent the opening 67 from being closed by the needle valve 65.

The upper side of the diaphragm 68 communicates directly with the float chamber 27 through a communicating opening 72 formed in the bottom of float chamber 27 so that the fuel can be supplied to the second main jet 62. The housing 70 is connected to a vacuum pipe 73 which is connected to a vacuum chamber 74 defined between the housing 70 and the diaphragm 68.

As illustrated in FIG. 3, the vacuum pipe 73 is connected to a solenoid valve 75 so as to introduce either vacuum or atmospheric pressure into the vacuum chamber 74. The vacuum pipe 73 is connected to the intake manifold 2 through a surge tank 67, check valve 77 and a second vacuum pipe 78 from the solenoid valve 75. The solenoid valve 75 is switched between its vacuum intake position and an atmospheric intake position by a control unit 14. The solenoid valve 75 is provided with an opening to the atmosphere 79.

FIG. 5 is a block diagram illustrating an alternate electronic control circuit for the control unit 14. This circuit is identical to that of FIG. 2 except for the addition of a solenoid drive circuit 37 actuated by the output of comparator 34 in the same manner as is the motor drive 36. The solenoid valve 75 is switched into the vacuum position under control of the solenoid drive circuit 37 at the same time the servo motor 12 drives the variable length intake mechanism to the high speed running mode. Alternatively, the solenoid valve 75 is switched into the atmospheric position when the servo motor 12 is placed in the low speed running mode.

The operation of this embodiment will be described with reference to FIGS. 3-5. The operation of the variable intake pipe length mechanism and variable throttle device is the same as that of the first preferred embodiment except that the variable fuel adjusting mechanism is actuated in response to the output of the comparator 34.

FIG. 3 shows the condition of the system in the low speed running mode. The variable intake pipe length mechanism is kept in its extended state while the throttle degree of the shutter 18 is restricted by a return spring 19. In the variable fuel adjusting mechanism, the vacuum chamber 74 is subjected to atmospheric pressure so that the needle valve 65 is opened and so that the second main jet 62 can supply fuel in addition to the first main jet 61. This causes the vacuum level to rise by allowing the carburetor to throttle properly and fuel is supplied at a relatively large quantity by the variable fuel adjusting mechanism even if the pulsating wave level is increased. As a result, the air/fuel ratio is retained at its optimum level. In the embodiment of FIG. 3, the shutter 18 is prevented from over restricting intake air due to the supplement of fuel by the variable fuel adjusting mechanism so that intake air is sufficiently supplied the engine during low speed running.

As the vehicle speed increases to above the speed set point so that the output of the comparator 34 changes state, the servo motor 12 and the solenoid valve 75 are actuated in response to the signal from the control unit 14 to switch the air/fuel ratio into the high speed running mode. The servo motor 12 revolves in response to the signal from the control unit 14 and the variable intake pipe length mechanism is placed into the high speed mode. Simultaneously, the shutter 18 is opened in the same manner as that of the first preferred embodiment. The shutter valve 75 is switched to apply vacuum to the cup 69 under control of the control unit 14 in synchronism with the actuation of the variable intake pipe length mechanism. The vacuum stored in the surge tank 76 and received from the intake port 2 is introduced into the housing 70 through vacuum pipe 73 and the cup 69 is pulled downwardly. Thus, the needle valve 65 is moved downwards to tightly close the opening 67 of the second main jet 62. The fuel is supplied through only the first main jet 61 to restrict the fuel quantity so that the fuel enriched state caused by the overvacuum at the venturi section can be corrected to adjust the air/fuel ratio to its optimum level.

As the engine speed reaches the predetermined value after switching from the high speed running mode to the low speed running mode, the signal representing the engine speed is input to the control unit 14. The output of the comparator 34 then commands the motor drive circuit 36 and the solenoid drive circuit 37 to switch to a low speed running mode. In the variable fuel adjusting mechanism, the needle valve 65 is opened by the switching motion of the solenoid valve 75 and the fuel is supplied through the second main jet 62 in addition to the first main jet 61. As a result, the air/fuel ratio is adjusted to the low speed running mode. In the embodiment of FIG. 3, the shutter 18 need not be closed to the same degree as the embodiment of FIG. 1 during the low speed running mode as the enriching effect of the variable fuel adjusting mechanism supplements this restrict of the air intake.

The system according to the second embodiment can generate excellent performance over the entire engine speed range since the system is provided with the variable fuel adjusting mechanism in addition to the variable intake pipe length mechanism and the variable throttle mechanism. In other words, the opening area ratio $R = S_1/S_2$ will decide the compensation degree of the air/fuel ratio where $S_1$ represents the intake passage area when fully open, and $S_2$ represents the intake passage area when restricted by the shutter 18. As the opening area ration $R = S_1/S_2$ becomes large, the compensating degree of the air/fuel ratio also becomes large. Therefore, the compensation of the air/fuel ratio is increased as the difference between the intake pipe length for the high speed running and that for the low speed running of the variable intake pipe length mechanism is increased. This requires an increase in the value of the opening area ratio R. However, if the opening area ratio R becomes too large, the intake air quantity becomes too small and thus a reduction in power and engine performance will be caused when the engine is controlled under low speed running. Thus, the opening area ratio R should be limited to a maximum value. On the other hand, even if the opening area ratio R is found within the range where the range performance can be free from overreduction of the intake opening area, this may not compensate fully for the variation in the intake tract length in each case. Accordingly, the system according to the second embodiment contains the variable fuel adjusting device to fully compensate in the above case. In this system, the variable throttle device cannot be completely regulated within the low speed running range lower than the minimum throttle degree, as the intake air must be sufficiently introduced to generate the required power. The variable fuel adjusting mechanism is cooperatively actuated to supply the enriched fuel to provide necessary compensation to the air/fuel ratio. As a result, the system can be kept in the desired combustion condition of the internal combustion engine even when equipped with a variable intake pipe length mechanism over the system's entire speed range.

Figure 6:
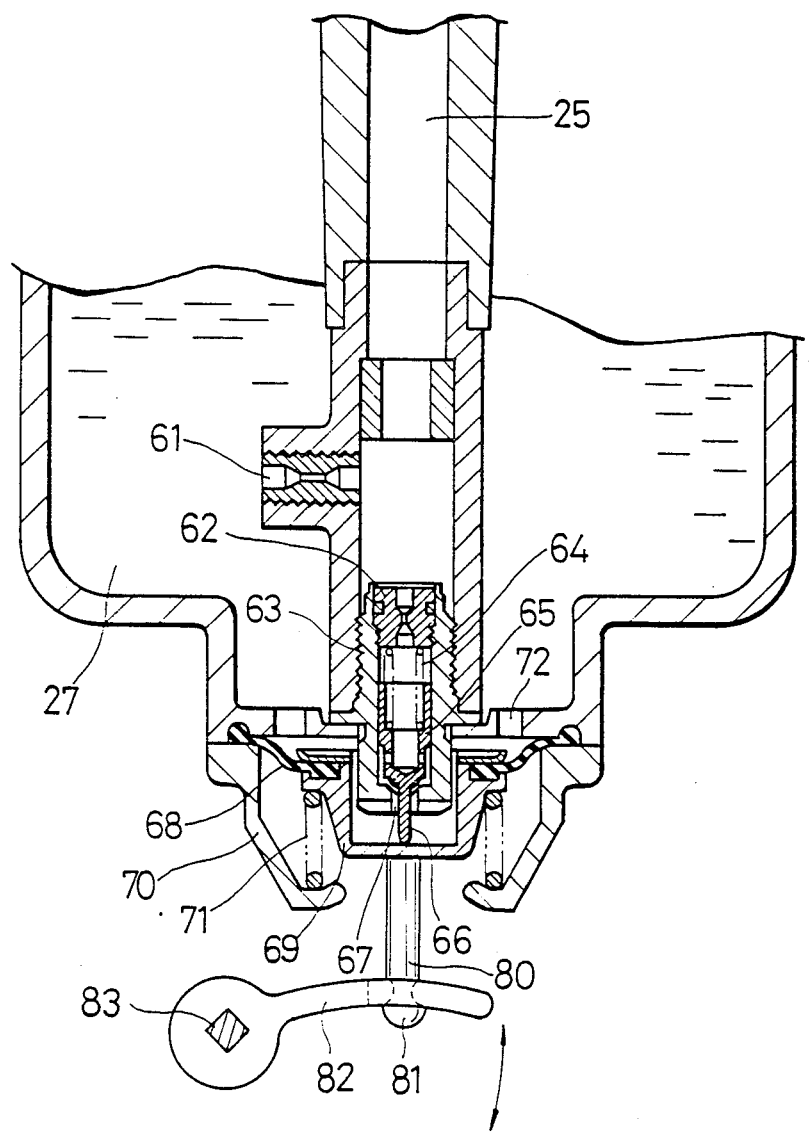
FIG. 6 is an enlarged sectional view illustrating an essential component utilized in a fourth embodiment of the present invention.

FIG. 6 shows a third embodiment which is essentially identical to the second embodiment except that the valve mechanism of the second main jet in the variable fuel adjusting mechanism is modified. In the third embodiment, the needle valve 65 is operated without using vacuum pressure. A rod 80 projects downwardly from the center of the cup 69 which is fixed to the diaphragm 68. An engageable groove 81 is formed at the tip section of the rod 80 and a form shape arm 82 is engaged within this groove 81. The arm 82 is fixed to a rotatable shaft 83 which may be rotated by the servo motor 12. The arm 82 is therefore raised vertically as shown by the arrow in FIG. 6. As the shaft 83 is rotated, the rod 80 fixed to the arm 82 is also moved in the vertical direction. This vertical motion causes the second main jet 62 to be switched between its opened and closed positions and the variable fuel adjusting mechanism is turned on or off. The shaft 83 can be supported by the carburetor 60. Further, the shaft 83 is preferably actuated by the servo motor 12. The system of this embodiment is not limited only to the use of a carburetor containing two main jets for variable fuel adjustment. Alternatively, a carburetor employing a diaphragm may be utilized.

In the third embodiment, the needle valve 65 is directly actuated by the rotatable shaft and thus quick response operation may be achieved at a low cost in comparison to methods that utilize a diaphragm actuated by vacuum pressure or a system where the switching operation is actuated by electromagnetic means.

FIGS. 7-10 illustrate additional embodiments of the present invention. They show various modifications of the variable throttle mechanism. Each of these devices throttles the opening area of the intake passage only in the low speed running mode and not in the high speed running mode. This system can always generate the optimum engine power over the entire engine speed range.

Figure 7:
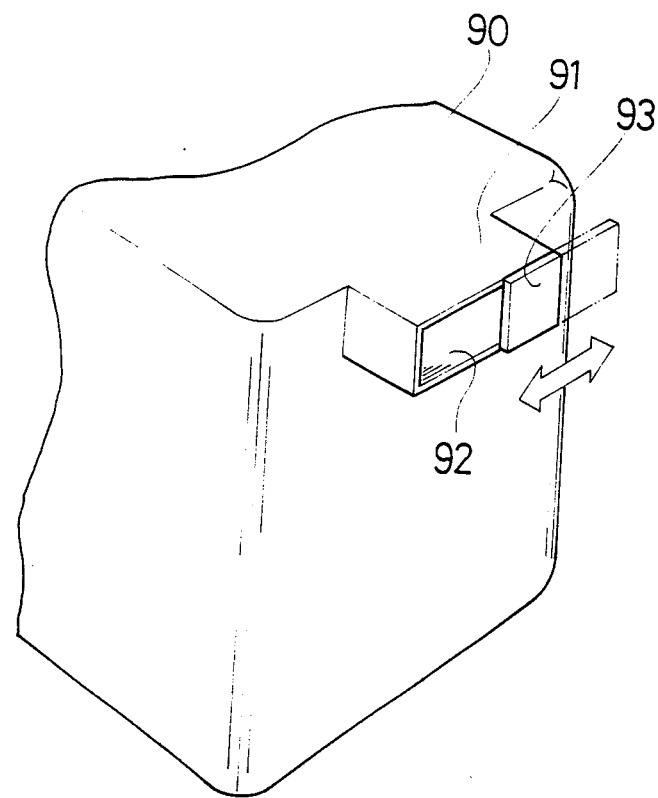
FIG. 7 is an enlarged perspective view illustrating an essential component according to a fifth embodiment of the present invention.

FIG. 7 employs the sliding type shutter for the variable throttle mechanism in which an air duct 91 is provided in the air cleaner case 90 and its opening 92 is adjustably closed by the sliding type shutter 93. This shutter 93 is slidably moved as represented by the phantom lines of FIG. 7 to adjust the throttle degree of the opening 92.

Figure 8:
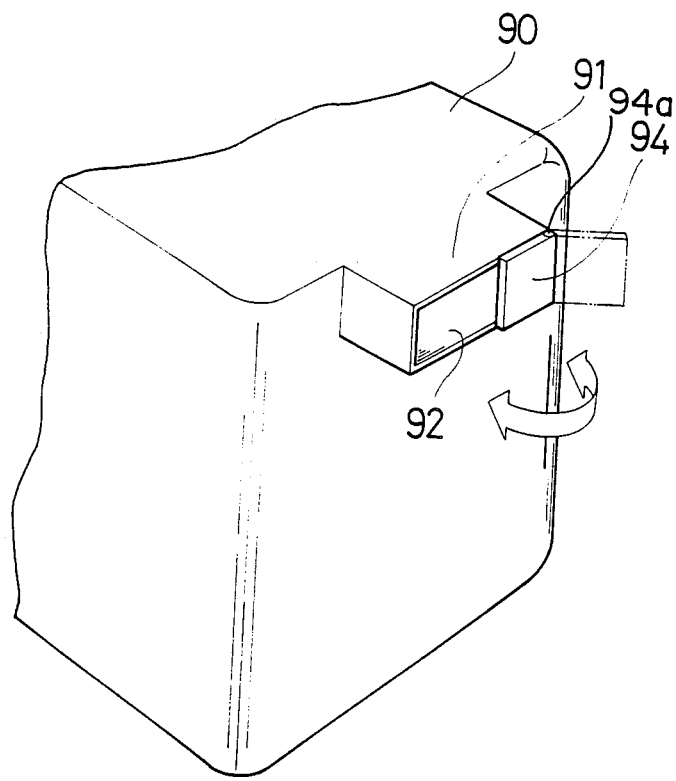
FIG. 8 is an enlarged sectional view illustrating an essential component according to a fifth embodiment of the present invention.

The embodiment of FIG. 8 employs a pivotal type shutter for the variable throttle mechanism in which a pivoting shutter 94 is pivotally set at the opening 92 by means of a hinge 94A. This shutter 94 can be turned as represented by the arrows of FIG. 8 to adjust the throttle degree of the opening 92.

Figure 9:
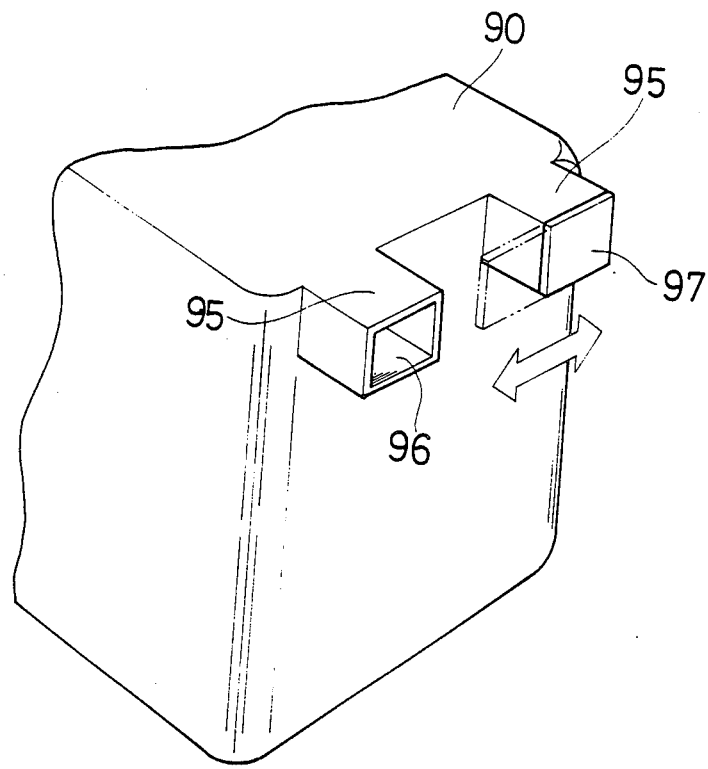
FIG. 9 is an enlarged perspective view of a sixth embodiment of the present invention.
Figure 10:
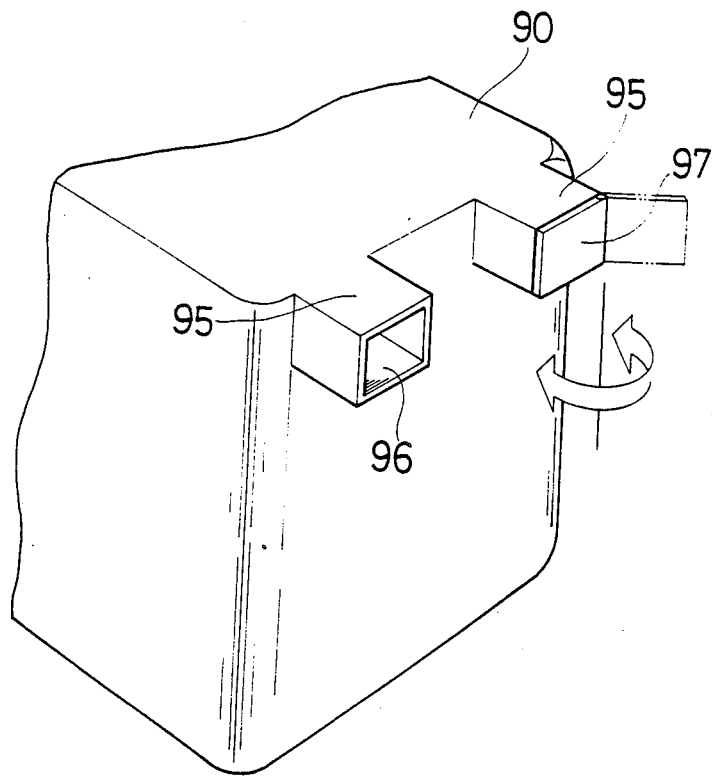
FIG. 10 is an enlarged perspective view illustrating an essential component of a seventh embodiment of the present invention.

FIGS. 9 and 10 show alternative modifications according to the teachings of the present invention wherein a pair of ducts are utilized, one of which is provided with a shutter. In the embodiment of FIG. 9, a sliding type shutter 97 adjustably closes an opening 96 in the same manner as that of the embodiment of FIG. 7. The FIG. 10 embodiment employs a hinged type shutter 98 to adjustably close an opening 96 in the same manner as that of the embodiment of FIG. 8. By employing at least two ducts, the adjustable duct may be fully closed during low speed operation. The variable throttle mechanism according to the teaching of the present invention is not limited to the above described configurations. For example, the variable throttle mechanism may employ a pair of plates formed with many slits which may be overlapped to the desired degree by sliding or turning the overlapping plates to adjust their opening area. Further, the variable throttle mechanism may be actuated by a servo motor controlled in response to engine speed. Any suitable method to control the servo motor may be employed.

The variable throttle mechanism performs its throttling operation only during low speed running in a low speed running mode to increase the air flow resistance and thus the vacuum pressure level at the venturi section so as to keep the fuel drawn from the float bowl at a constant rate. In the high speed running mode, the throttle is not actuated so as to introduce a sufficient quantity of intake air for high speed operation. Accordingly, the system of the present invention generates optimum engine power over all speed ranges.

Figure 11:
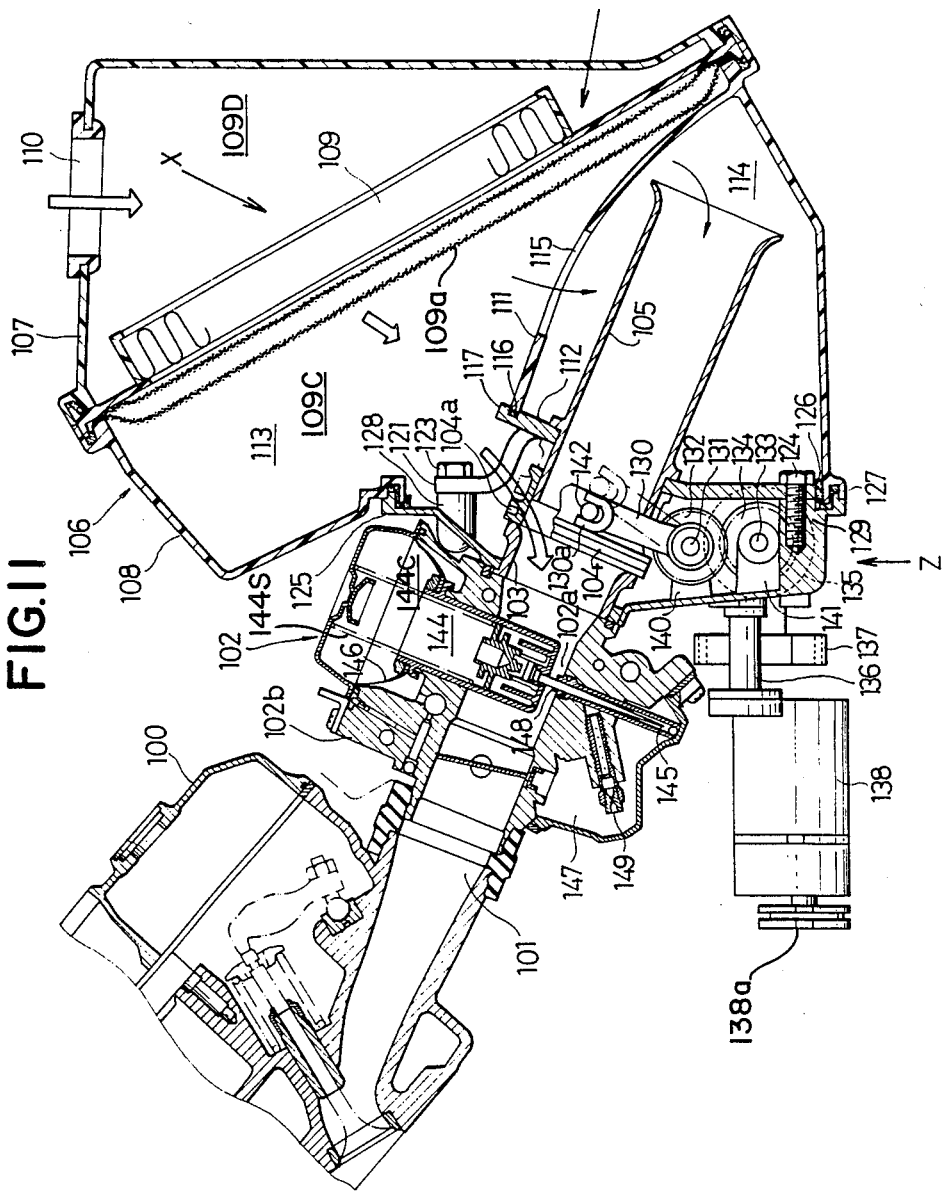
FIG. 11 is an enlarged sectional view of an intake system employed in an eighth embodiment of the present invention.

FIGS. 11-16 show another preferred embodiment of the intake device of the present invention which is also particularly designed for use in a motorcycle. FIG. 11 is a sectional view of an intake system for an internal combustion engine according to this embodiment.

An intake port 101 of the internal combustion engine 100 is connected to a carburetor 102. Upstream of the carburetor 102, a stationary intake pipe 103 is fixedly arranged. The upstream end of the stationary intake pipe 103 may be selectively connected to a guide pipe 105 through a moveable intake pipe 104 which is cylindrically shaped and is slidably mounted about the end section of the guide pipe 105. The stationary intake pipe 103, the moveable intake pipe 104, and the guide pipe 105 collectively form a variable intake pipe length mechanism. The detailed construction of this mechanism need not be described as it is the same as that of the other embodiments of the present invention.

The variable intake pipe length mechanism is wholly housed in an air cleaner case 106. The case 106 comprises a top case 107 and a bottom case 108. The interior of the case is divided by an air cleaner element 109 into a dirty side 109D open to the ambient air and a clean side 109C open to the intake pipe. An opening formed in the side wall of the dirty side 109D forms a first intake passage 110. A wire gauge element 109a is further provided in juxtaposition to said filter 109.

The interior of the clean side 109C is further divided into two chambers, a high speed chamber 113 and a low speed chamber 114, by a dividing wall 111 and an intake pipe stay 112. FIG. 7 shows a plan view taken in the direction X of FIG. 11 of the interior of the air cleaner case 106 with the top case 107 and the air cleaner element 109 removed. The dividing wall 111 is integrally extended inwardly from the wall of the air cleaner case 106 and is formed with a plurality of openings 115 which collectively form a second intake passage for communicating between high speed chamber 113 and a low speed chamber 114. The protruded forward end of the wall 111 is connected to one end 117 of the intake pipe stay 112 through a sealing member 116 such as a sponge or gasket.

Figure 13:
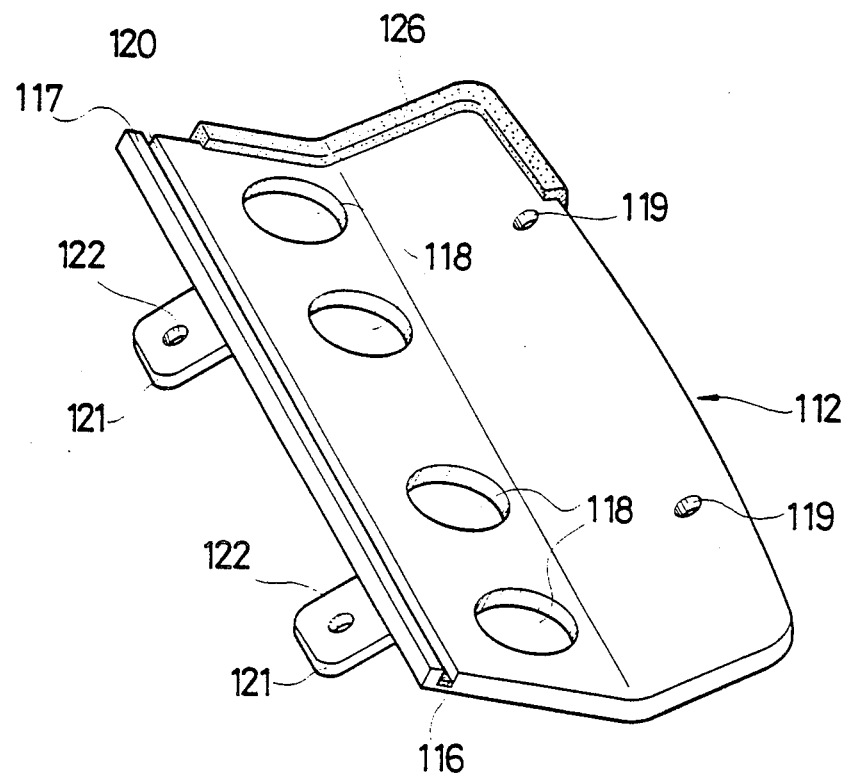
FIG. 13 is a schematic view showing the intake pipe stay utilized in this eighth embodiment.
Figure 14:
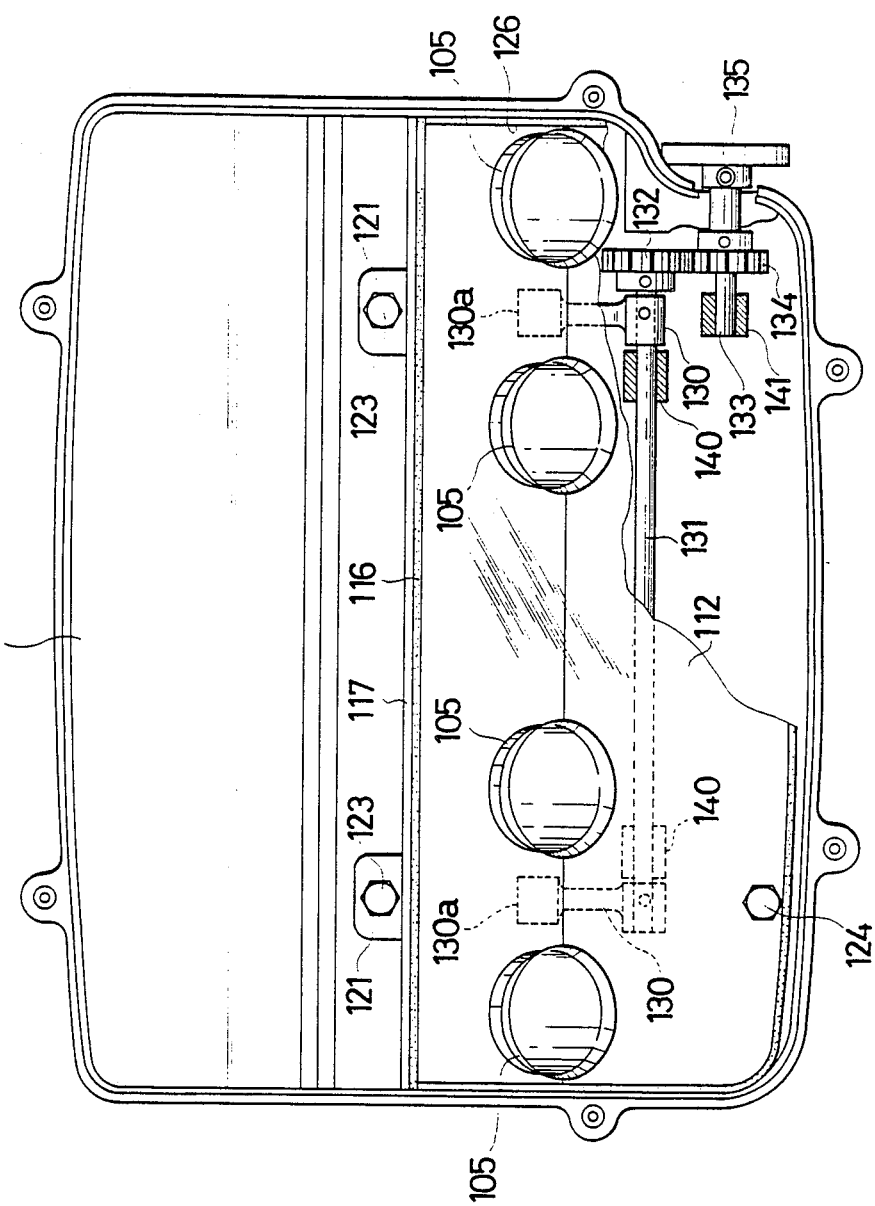
FIG. 14 is a schematic view taken in the direction of the arrow Y of FIG. 11 showing the interior of the air cleaner case.

As shown in FIG. 13 and FIG. 14, the intake pipe stay 112 is a plate member of substantially rectangular shape having a plurality of openings 118 fitted with the guide pipes 105 and a plurality of fitting holes 119 for mounting the stay 119, itself. The end 117 of the stay 112 is formed with a groove 120 which engages the protruded end of the dividing wall 111. The sealing member 116 is mounted in the groove 120. A plurality of fitting stays 121 integrally protrude from the end 117 of the stay 112. Each of the stays 121 are provided with a hole 122 for a mounting bolt. Thus, the intake stay 112 is fixed to a carburetor fitting plate 125 through fitting holes 119,122 and the bolts 123 and 124.

In FIG. 13, a sealing member 126 of a sponge like material is mounted to surround the periphery of the intake pipe stay 112 except for the end 117. As the intake pipe stay 112 is assembled with the bottom case 108, the sealing member 126 will be tightly fitted to the interior face of the bottom case 108.

Figure 12:
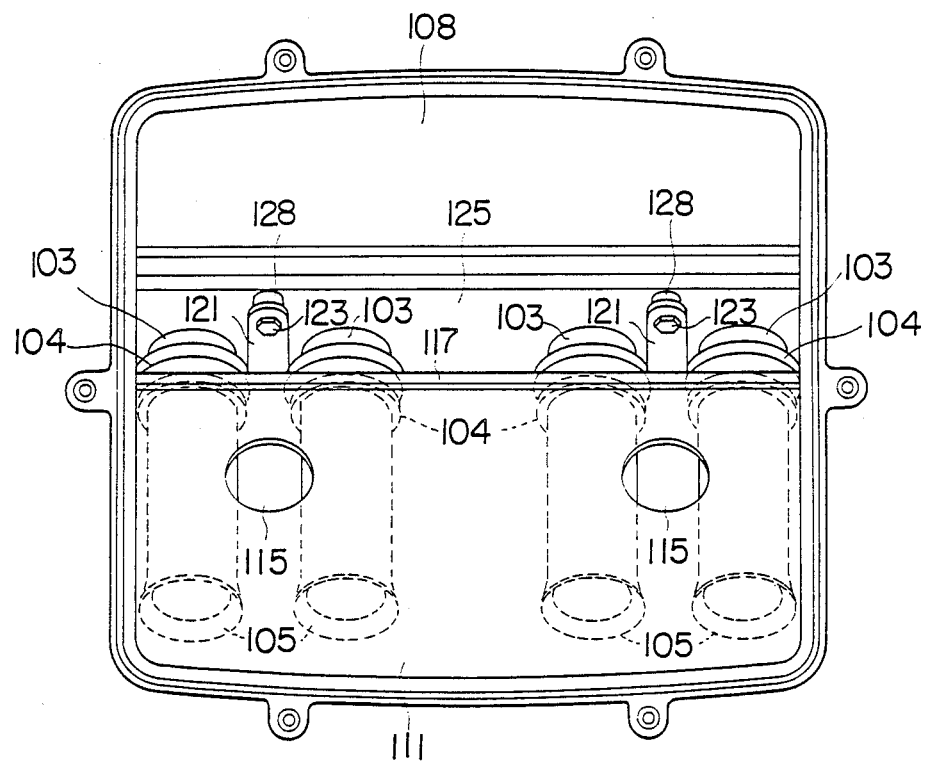
FIG. 12 is a plan view taken in the direction of the arrow X in FIG. 11 showing the dividing wall of the air cleaner case.

FIG. 14 is a schematic illustration of an intake pipe stay 112 taken in a direction represented by the arrow Y of FIG. 11 with the top case 107, air cleaner element 109, and dividing wall 111 removed. As shown in FIG. 11 and FIG. 12, the carburetor fitting plate 125 is previously assembled with the carburetor 102. The bottom case 108 is formed with a plurality of openings in its bottom periphery for receiving the carburetor fitting plate 125 and the sealing member 127. In FIG. 11, bosses 128 and 129 are integrally and protrudingly formed in the bottom case for engaging with the bolts 123 and 124.

As shown in FIG. 11, the end of the guide plate 105 is engaged with the fitting opening 118 of the intake pipe stay 112 and the upstream side of the guide plate 105 is opened into the low speed chamber 114. The downstream side of the guide plate 105, the moveable intake pipe 104 and the stationary intake pipe 103 are disposed in the high speed chamber 113. According to this arrangement, the periphery around the stationary intake pipe 103 and the moveable intake pipe 104 are not separated from the air filter by the intake pipe stay 112 so the periphery is opened directly to the air cleaner element 109 and the high speed chamber 113.

Figure 15:
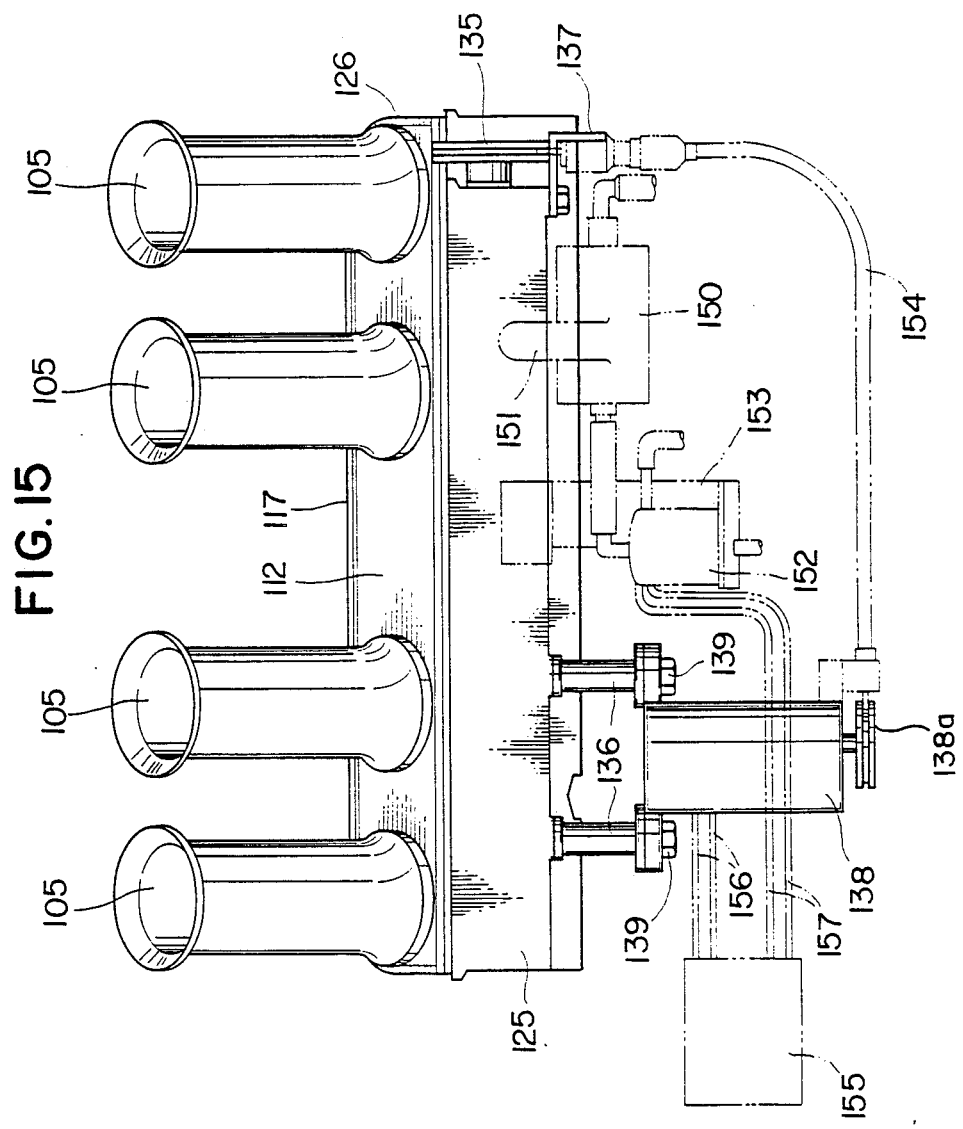
FIG. 15 is a schematic view taken in the direction of the arrow Z of FIG. 11 showing the carburetor fitting plate as assembled to the intake pipe stay.

The driving parts for sliding a moveable intake pipe 104 along the guide pipe 105 are mounted on the carburetor fitting plate 125 as may be best seen in FIGS. 111 and 114. The driving parts include a rotatable arm 130 mounted on an arm shaft 131 driven by an arm shaft gear 132. The arm shaft gear 132 communicates with a drum shaft gear 134 provided on a drum shaft 133 having a drum 135 affixed thereto. A boss 136 supports a servo motor 138. The servo motor 138 is provided with a servo motor drum 138A. The servo motor 138 is fixed to the carburetor fitting plate 125 by fixing bolts 139 which mount the servo motor 138 to bosses 136 as illustrated in FIG. 15. FIG. 15 is a perspective view taken in the direction represented by the arrow Z in FIG. 11 illustrating the assembled state of the servo motor 138 on the carburetor fitting plate 125.

The arm shaft 131 is longitudinally arranged in the air cleaner case 106 and rotatably mounted on stay 140 which is fixed to the carburetor fitting plate 125. The rotatable arms 130 are fixed to both ends of the arm shaft 131 near the stays 140.

The drum shaft 133 is rotatably mounted on a stay 141 fixed to the carburetor fitting plate 125. The drum shaft gear 134 and the drum 135, which is located outside the air cleaner case 106, are fixed to the drum shaft 133. The drum shaft gear 134 meshes with the arm shaft gear 132 with the drum shaft gear having the larger diameter. The drum shaft gear 134 and the arm shaft gear 132 collectively constitute a reduction gear mechanism. This can achieve a high reduction rate, if desired. As an alternative, these gears may provide an accelerating mechanism. The reduction rate or accelerating rate can be varied over a wide range.

Figure 16:
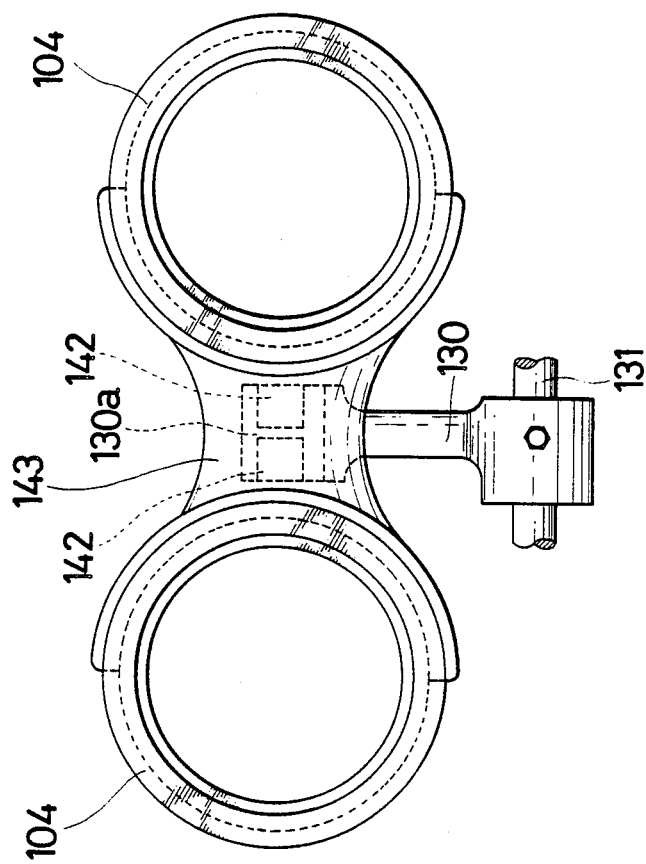
FIG. 16 is an enlarged schematic illustration showing an essential component of this eighth embodiment of the present invention.

The rotatable arm 130 as illustrated in FIG. 11 is provided with a tip end having a U-shaped section 130A which engages a projection 142 which protrudes outwardly from the moveable intake pipe 104 as illustrated in FIG. 16. The external periphery of the moveable intake pipe 104 is provided with a groove 104A. A pair of moveable intake pipes 104 are arranged in parallel to each other and are assembled in a single member through a bridge member 143 which engages with the groove 104A. The U-shaped section 130A engages a pair of the projections 142 to facilitate the movement of an adjacent pair of moveable intake pipes 104 simultaneously by a single rotatable arm 130.

The carburetor 102 has a structure similar to that utilized in the first embodiment of the present invention. A piston valve 144 is arranged in a carburetor housing 102B above a venturi section 102A of the carburetor 102 so as to move vertically. In the bottom of the piston valve 144, a needle jet 145 is provided. A return spring is installed in the vacuum chamber 144C which is isolated from the ambient air through a diaphragm 146 so that the piston valve 144 is biased downwardly by the force of spring 144S. The jet needle is arranged so as to adjust the amount of opening of a main nozzle 148 extending from a float chamber 147 to provide fuel to the venturi section 102A of the carburetor 102. One end of the main nozzle 148 protrudes into the float chamber 147 and a main jet 149 is also arranged therein.

This preferred embodiment of the present invention operates as follows. The device of FIG. 11 is configured in a low speed running mode, where the moveable intake pipe is positioned so as to contact the stationary intake pipe 103 to form an effective intake pipe length which is relatively long. The intake pipe length becomes long in this mode and the air is introduced from the right end of the guide pipe 105. In this state, the intake air passes through the low speed chamber 114 and thus intake air flow is automatically channeled from the high speed chamber 113 to the low speed chamber 114 through the second intake passage 115. Accordingly, the vacuum pressure is increased as is the air flow resistance. The vacuum pressure applied to the main nozzle 148 is therefore increased so as to reduce the effects of the pulsating wave developed by the long intake pipe. As a result, the air/fuel ratio may be adjusted to an optimum value for low speed running.

When the engine speed increases above a predetermined level to place the intake system in a high speed running mode, the servo motor 138 is revolved a predetermined amount, as is described with respect to the first embodiment. The drum 135 is therefore rotated to shift the drum shaft gear 134, arm shaft gear 132, arm shaft 131 and rotatable arm 130 in the clockwise direction to move the arm 130 into the position shown in phantom lines in FIG. 1. This moves the projection 142 of the moveable intake pipe 104 and thus shifts the moveable intake pipe 104 away from the stationary intake pipe 103 by drawing the moveable intake pipe 104 over the guide pipe 105 so that a gap is opened between the moveable intake pipe 104 and the stationary intake pipe 103. This allows air to flow from the high speed chamber 103 directly through the gap as directed by the white arrow in the drawing. The intake air flows through the short intake passage produced by the gap between the moveable intake pipe 104 and stationary intake pipe 103 and thus bypasses the second intake passage 115, flowing through the first intake passage 110, air filter 109 and high speed chamber 113. Thus, the air flow resistance is reduced to adjust the air/fuel ratio in the high speed running mode.

As can be seen by the FIG. 11 illustration and the above description, the mechanism for changing the intake air flow resistance is performed according to this embodiment only by the variable intake pipe length mechanism. Accordingly, the embodiment of FIG. 11 exhibits a remarkably simple structure which reduces moving components to the extent possible. Further, the required air/fuel ratio can be easily set by adjusting only the carburetor if the intake passage area and the capacities of the high and low speed chambers are properly selected.

In the embodiment of FIG. 11, the parts of the drive system for the moveable intake pipe 104 are wholly preassembled on the carburetor fitting plate 125. The carburetor may then be attached to this assembly and the carburetor and intake assembly may be attached to the engine body 100 only by connection of the carburetors to the intake port 101. This may improve the working efficiency of the assembly line.

The preassembling of the drive system for the moveable intake pipe 104 on the carburetor fitting plate 125 is not limited as described above, but various alternative constructions may be employed. For example, if the carburetor 102 utilized in the embodiment of FIG. 11 is replaced by variable fuel adjusting type carburetor, the components for such a variable fuel adjusting type carburetor may be preassembled. Among these components include those components shown in phantom lines in FIG. 15 including a surge tank 150, a stay 151, a solenoid 152 and another stay 153. Such a system would also include a wire cable 154, control unit 155, and control lines 156,157.

Figure 17:
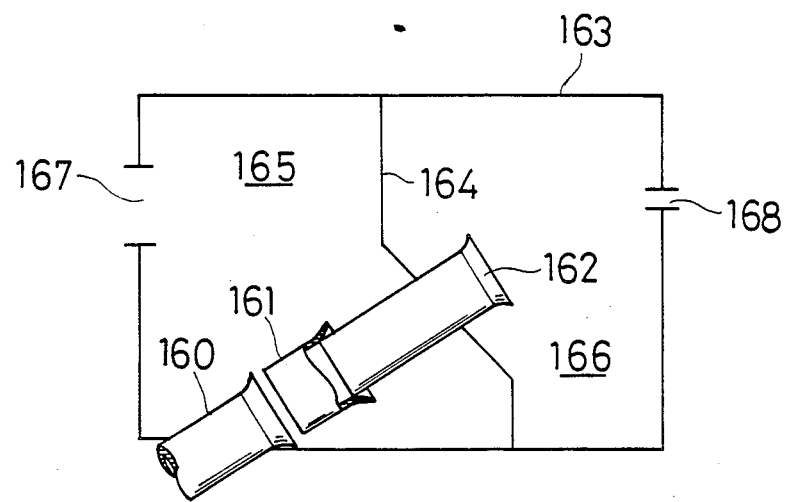
FIG. 17 is a schematic illustration for explaining the system of a ninth embodiment of the intake device according to the teachings of the present invention.
Figure 18:
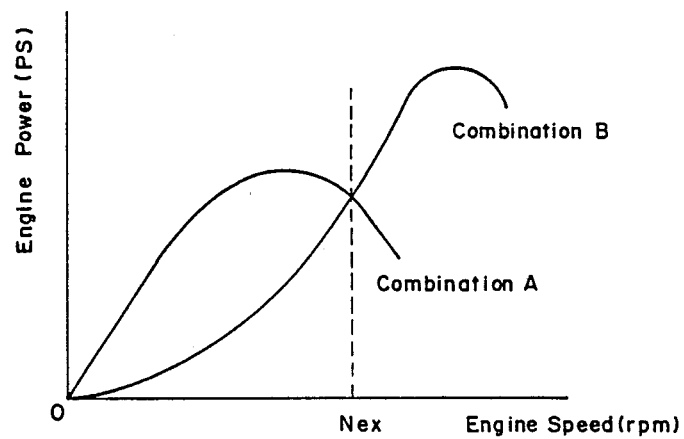
FIG. 18 is a graph showing the relationship between the intake pipe length and engine power.
Figure 19:
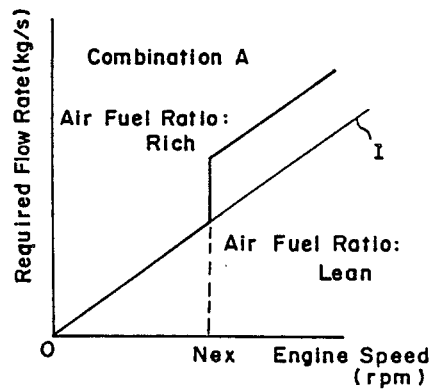
FIG. 19 is a graph showing the relationship between engine speed and flow rate for a long intake pipe.
Figure 20:
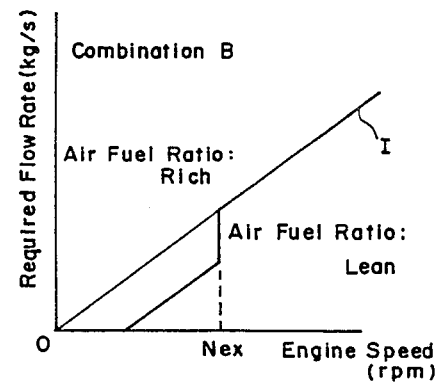
FIG. 20 is a graph showing the relationship between engine speed and flow rate for a short intake pipe.

FIG. 17 illustrates another embodiment of the present invention which is a modification of the embodiment illustrated by FIGS. 11-16. In the embodiment of FIG. 17, the components for the variable intake pipe length means, the stationary intake pipe 160, moveable intake pipe 161, and guide pipe 162 are housed in an air cleaner case 163. The interior of the air cleaner case is separated to make a high speed chamber 165 and low speed chamber 166 by means of an intake pipe stay 164 supporting the guide pipe 162. A first intake passage 167 is form ⓡd in the sidewall of the high speed chamber and a second intake passage 168 is formed in the sidewall of the low speed chamber, respectively. The diameter of the second intake passage 168 is smaller than that of the first intake passage 167 so that the air flow resistance through the second intake passage 168 is greater than that of the first intake passage 167.

According to this construction, the moveable intake pipe connects between the stationary intake pipe 160 and the guide pipe 162 to selectively extend the intake pipe length. Air is introduced through the second intake passage 168 to the guide pipe 162 during the low speed mode. As the second stake passage 168 has a reduced cross section, the air flow resistance is increased. On the other hand, as the moveable intake pipe is separated from the stationary intake pipe 160 to decrease the effective intake pipe length, air is introduced to the carburetor through the first intake passage 167 and high speed chamber 165. As the cross sectional area of the first intake passage 167 is larger than that of the second intake passage 168, air flow resistance is decreased. This modified device also automatically adjusts the vacuum pressure level at the main nozzle in the carburetor in response to the switching operation of the intake pipe length in the same manner as that disclosed with regard to FIG. 11. Such a construction allows the low speed chamber to be made larger than in the embodiment of FIG. 11 so that the system is suitable for use in a larger vehicle, for example, a full size car.

The configuration of the fixed throttle may be varied in addition to that described in the embodiments of FIGS. 11 and 17. For example, the air duct formed in the air cleaner case may be used and an obstacle plate may be arranged at its inlet or in the passage of the air cleaner case so as to restrict the air flow rate. Alternatively, the air duct may be formed in a relatively narrow space so that the air duct per se functions as the throttle section. Further, the diameter of the intake pipe may be varied in response to pipe length.

FIG. 24-27 illustrate another embodiment of an induction system for an internal combustion engine. This preferred embodiment is also designed to preferably be utilized in a motorcycle. Once again, like elements are identified with like numerals throughout the drawings.

In the embodiment of FIGS. 24-27, an induction system for a four-cylinder internal combustion engine is illustrated. This embodiment is similar to the embodiment illustrated in FIGS. 11-16, and thus only differences in structure will be discussed. As in the FIG. 11 embodiment, a carburetor is associated with each cylinder ot the internal combustion engine and is connected to an intake manifold (not shown in this Figure). The embodiment of FIGS. 24-27 primarily differs from the embodiment of FIGS. 11-16 in the type of driving system for the moveable intake pipes 104A-D.

Figure 24:
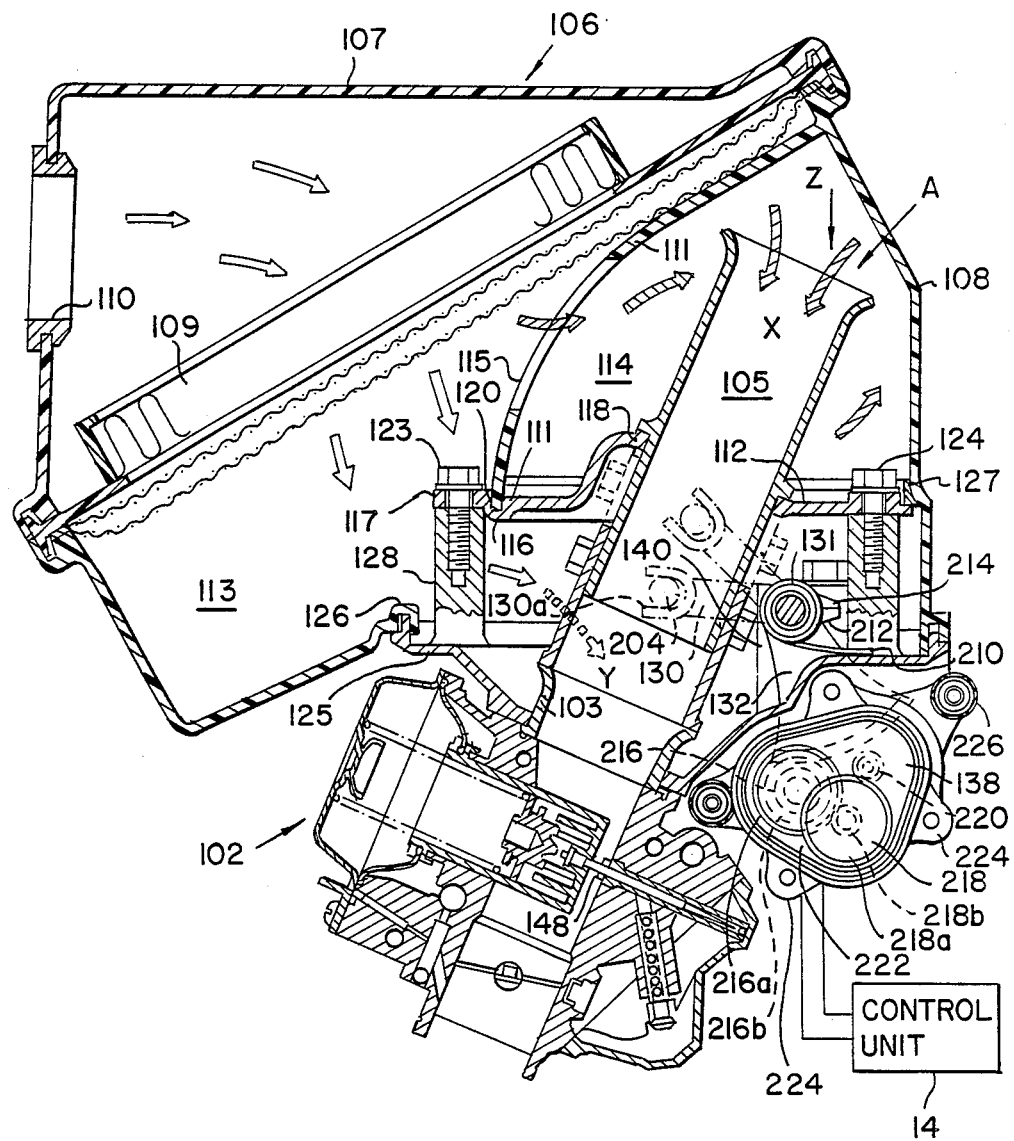
FIG. 24 is a sectional view of an induction system according to a ninth embodiment of the present invention.
Figure 25:
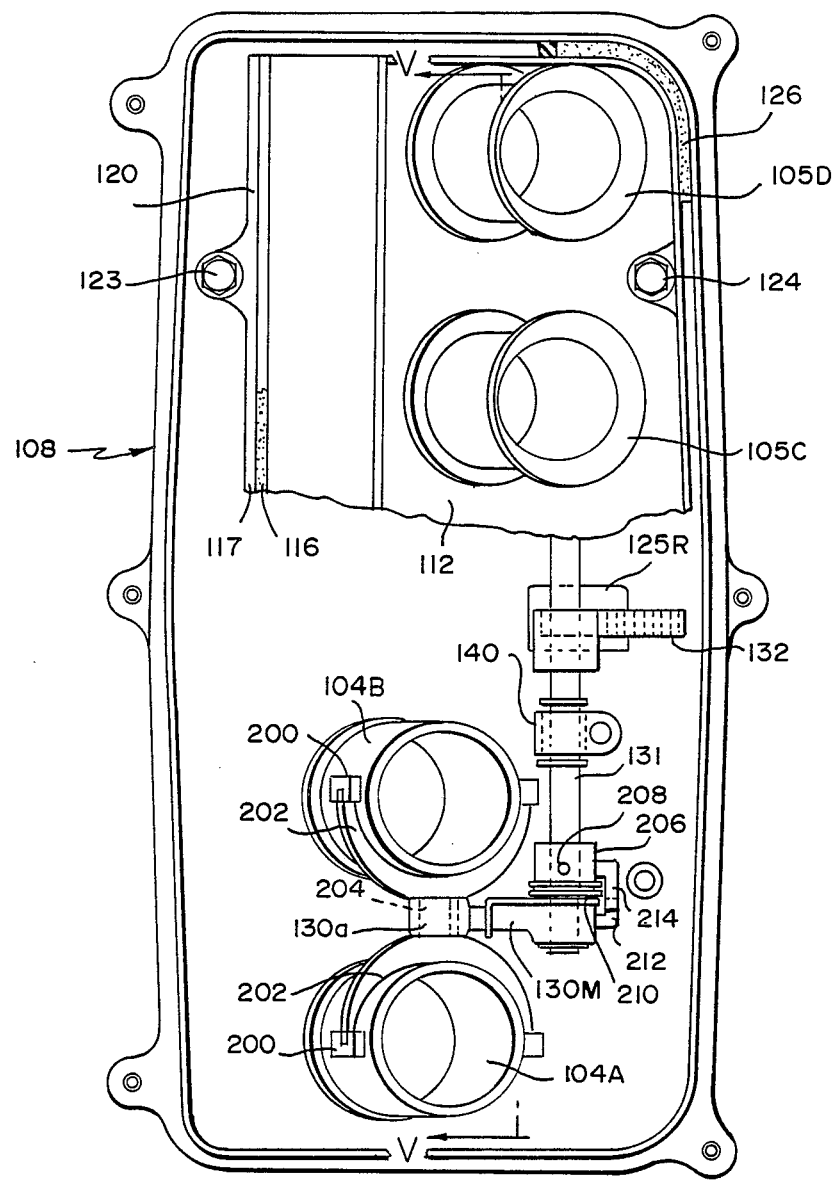
FIG. 25 is a view illustrating the shape of the inside of an air cleaner case of the induction system of FIG. 2 as viewed from the direction indicated by the arrow Z.
Figure 27:
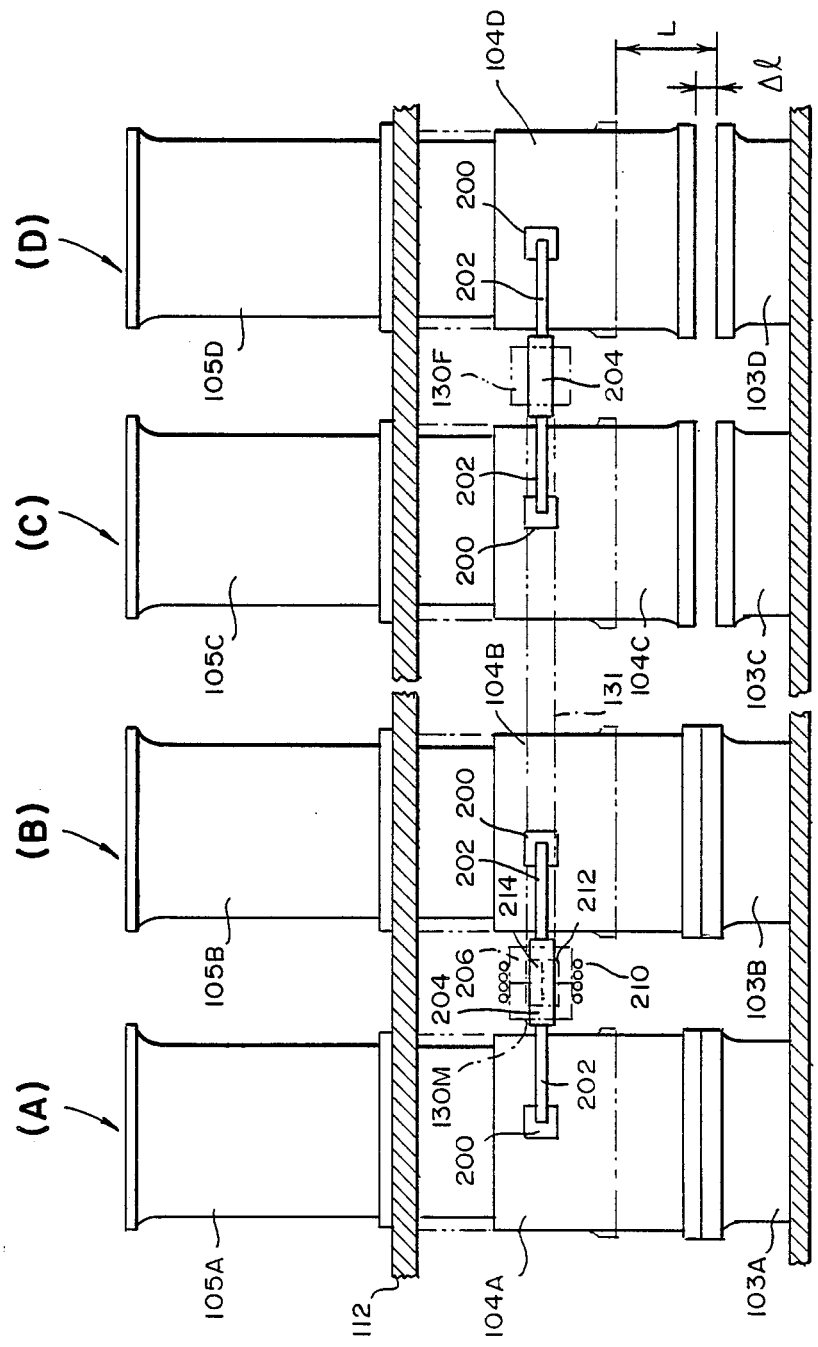
FIG. 27 is a sectional view taken along line VV of FIG. 25.

In the embodiment of FIGS. 24–27, a projected portion 204 is provided in association with each pair of moveable intake pipes 104A, 104B, or 104C, 104D. This projected portion 204 communicates with the U-shaped section 130A of a rotatable arm 130. In the preferred embodiment of FIGS. 24–27, moveable intake pipes 104A, 104B are mounted on a moveable rotatable arm 130M While moveable intake pipes 104C, 104D, are affixed to a fixed rotatable arm 130F. Each projected portion 204 is integrally formed with a pair of semi-arcuate bridge members 202 connected to the opposite ends thereof as illustrated in FIGS. 25, 26. Each end portion of each of the semi-arcuate bridge members 202 is engagingly mounted to a fitting portion 200 integrally formed on a side face of each of the slide valves 104A–D. Accordingly, the adjacent slide valves 104A,B are connected to the moveable rotatable arm 130M, and the slide valves 104C,D are connected to the fixed rotatable arm 130F. Thus, the moveable intake pipes 104A–D are controlled as pairs. As illustrated in FIG. 5, the moveable intake pipes 104A,B are positioned in advance of the moveable intake pipes 104C,D, by a suitable difference $\Delta l$. The value of $\Delta l$ is set so as to minimize the disorder of the fuel condition and is given by $$\Delta l = \Delta l_1 = \Delta l_2 = \Delta l_3 \quad (2)$$

where $\Delta l_1$ is an error in height among the high speed guide pipes 105A–D, $\Delta l_2$ is an error in the set position between the rotatable arms 130M, 130F and $\Delta l_3$ is a correction value.

The fixed rotatable arm 130F and moveable rotatable arm 130M are mounted at opposite ends of the arm shaft 131. The moveable rotatable arm 130M is illustrated at the bottom of FIG. 25 and is mounted for rotation on the arm shaft 131. The fixed rotatable arm 130F is fixed to the arm shaft 131.

The moveable rotatable arm 130M is provided with a stopper 206 which is secured to the arm shaft 131 by means of a pin 208 as illustrated in FIG. 25. A torsion spring 210 is provided between the stopper 208 and the moveable rotatable arm 130M. One end of the torsion spring 210 is supported on the moveable rotatable arm 130M while the other end is supported on the carburetor base 125. The moveable rotatable arm 130M is urged in the counterclockwise direction of FIG. 24 around the arm shaft 131. A first pull 212 is projectingly formed to extend from the rear portion of the moveable rotatable arm 130M and is engageable with a second pull 214 affixed to the stopper 206.

The arm shaft 131 is disposed in the air cleaner case 106 and supported for pivotal motion on a supporting portion or stay 140 mounted to the carburetor base 125. The arm shaft gear 132 has, in this embodiment, a sector shape and is fixably supported on the arm shaft 131. The tooth portion of the sector shaped arm shaft gear 132 is accommodated by a recessed portion 125R provided in the carburetor fitting plate 125 where the arm shaft gear 132 communicates with a drive gear 216. The drive gear 216 is a stepped gear and includes a larger diameter portion 216A and a smaller diameter portion 216B. The smaller diameter portion 216B is accommodated in the recessed portion 125R of the carburetor fixing plate 125 as described hereinabove and is constrained in normal meshing engagement with the arm shaft gear 132. An idler gear 218 which is also a stepped gear is provided with a larger diameter portion 218A which meshes with an output gear 220 of the servo motor 138 while a smaller diameter portion 218B meshes with the larger diameter portion 216A of the drive gear 216. This gear train collectively forms a speed reduction gearing. Alternatively, the gear train may provide an overdrive gear, when desired.

A gear housing 222 upon which the servo motor 138 is mounted contains the gears 216, 218 and 220 and is mounted on the carburetor fitting plates or base 125 by mounting portions 226. The servo motor 138 is mounted to the gear housing 222 on mounting portions 224. It should be noted that the larger diameter portion 216A of the drive gear 216 and the idle gear 217 are provided on an upper face of the gear housing 222.

A control unit 14 controls the servo motor 138 in response to the rotational speed of the internal combustion engine as is previously described.

The embodiment of FIGS. 24–27 functions as follows.

FIG. 24 illustrates this embodiment in the low speed running condition where the moveable intake pipe 104A (to 104D) is connected to the guide pipe 105A (to 105D). Just before the pipe length is changed over to the condition illustrated in FIG. 24, the servo motor 138 is driven to pivot the arm shaft 131 to operate the moveable rotatable arm 130M and the fixed rotatable arm 130F downwardly in the counterclockwise direction in FIG. 24. At first, the moveable intake pipes 104A and 104B connected to the moveable rotatable arm 130M are brought into contact with the fixed intake pipes 102A and 102B. The moveable intake pipes 103A and 103B contact their respective fixed intake pipes 102A and 102B earlier than the moveable intake pipes 103C and 103D contact the fixed intake pipes 102C and 102D. The movement of the moveable intake pipes 103A and 103B are advanced with respect to the moveable intake pipes 103C and 103D by a distance of the difference $\Delta l$. At the time the moveable intake pipes 103A and 103B just contact the fixed intake pipes 102A and 102B, the moveable intake pipes 103C and 103D are left in a spaced relationship from the fixed intake pipes 102C and 102D by a clearance of $\Delta l$. The fixed rotatable arm therefore continues its pivotal motion until the moveable intake pipes 103C and 103D are in contact with the fixed intake pipes 102C and 102D. This movement is allowed due to the operation of the torsion spring 210 which allows continued movement of the arm shaft 131 with respect to the moveable rotatable arm 130M. Accordingly, the change in pipe length in the cylinders A and B is accomplished with a difference timing than the change in pipe length associated with cylinders C and D. This difference in timing corresponds to the difference in position $\Delta l$ between the moveable intake pipes 103A,B and the moveable intake pipes 103C,D.

When a high speed running condition is reached, if the rotational speed of the internal combustion engine falls below a predetermined speed, the servo motor 138 is again pivoted by a predetermined amount under control of the control unit 14 and the pivotal motion of the drive gear 216 is transferred to the arm shaft gear 132 so that the arm shaft 131 is pivoted. As a result, each rotatable arm 130M (and 130F) is pivoted upwardly in the clockwise direction in FIG. 24 to the position shown in the dot chain lines. It is to be noted, however, that the fixed rotatable line 130F starts its operation at the same time as the pivotal motion of the arm shaft 131. The moveable rotatable arm 130M operates after deforming the torsion spring 21? after the pawl 214 on the stopper 206 and the pawl 212 on the moveable rotatable arm 130M contact each other. Accordingly, the pair of the moveable intake pipe 103C and the moveable intake pipe 103D is spaced away from the fixed intake pipes 102C and l02D at a timing earlier than the shifting of the moveable intake pipes 103A and 103B by a difference Δl. When the moveable intake pipes 103C and 103D contact the intake pipe stay 112, the movement of these moveable intake pipes is stopped. Thereupon, gaps having a predetermined dimension 1 are provided between the individual fixed intake pipes 102A-102D and the individual moveable intake pipes 103A-103D as shown in FIG. 5.

In the above mentioned manner, not all of the plurality of moveable intake pipes which function as slide valves are operated at the same time. In the present embodiment, the moveable intake pipes or slide valves are paired together to allow each pair to operate at a different timing. When the variable length induction pipes are all shifted simultaneously, a temporary drop in the output power sometimes reaches a detectable level due to poor fuel operation during the transient shifting which occurs at the same time for all cylinders due to the simultaneous shifting of the moveable intake pipes or slide valves. However, according to the teachings of this embodiment, the individual slide valves are divided into individual sets which are shifted at different times, and thus the reduction in output at any point in time is reduced as illustrated in FIG. 23 by the dotted line as opposed to the solid line which illustrates the power drop which occurs when all moveable intake pipes or slide valves are shifted simultaneously. When, during the shifting operation, the shifting of the intake pipe length for all cylinders is not performed simultaneously and when the shifting of differing cylinder pairs is performed at different timings, the above mentioned fuel condition problem may be controlled to a level which may not be sensed by the operator during running, even though the level of poor fuel operation for each individual cylinder is not changed. Thus, a smoother running engine is produced.

Still another embodiment of the present invention is illustrated in FIGS. 29-33. Again, this embodiment is intended for use with an internal combustion engine for a motorcycle. This embodiment functions in a similar manner to that already described with respect to FIG. 11 and differs from the FIG. 11 embodiment primarily due to the provision of one or more slits formed in each moveable intake pipe or slide valve 104 and the associated guide pipe 105 which function to introduce additional air to the fixed intake pipe 103 during partial openings of the moveable intake pipe 104 in order to reduce the power drop during partial openings of the moveable intake pipe.

The system of FIGS. 29-33 differs from that of FIGS. 24-27 by the provision of one or more slits 104S on the moveable intake pipe 104 and one or more slits 105S provided on the guide pipe 105 which communicate therewith. Each slit 104S provided on a moveable intake pipe 104 is normally disposed in offset or displaced relationship with the associated slip 105S provided on the guide pipe 105 so that these slits do not pass any air therethrough. Therefore, when the moveable intake pipe or slide valve 104 is at an advanced or retracted limit position so as to be fully positioned in a high speed mode or a low speed mode, there is no overlap between the slits 104S and 105S and thus they do not function to pass air. However, when the gap between the moveable intake pipe 104 and the stationary intake pipe 103 equals a predetermined spacing $\Delta l_1$, the slits 104S begin to overlap the slits 105S to provide an air passage to pass supplemental air to the venturi of the carburetor 102.

Figure 29:
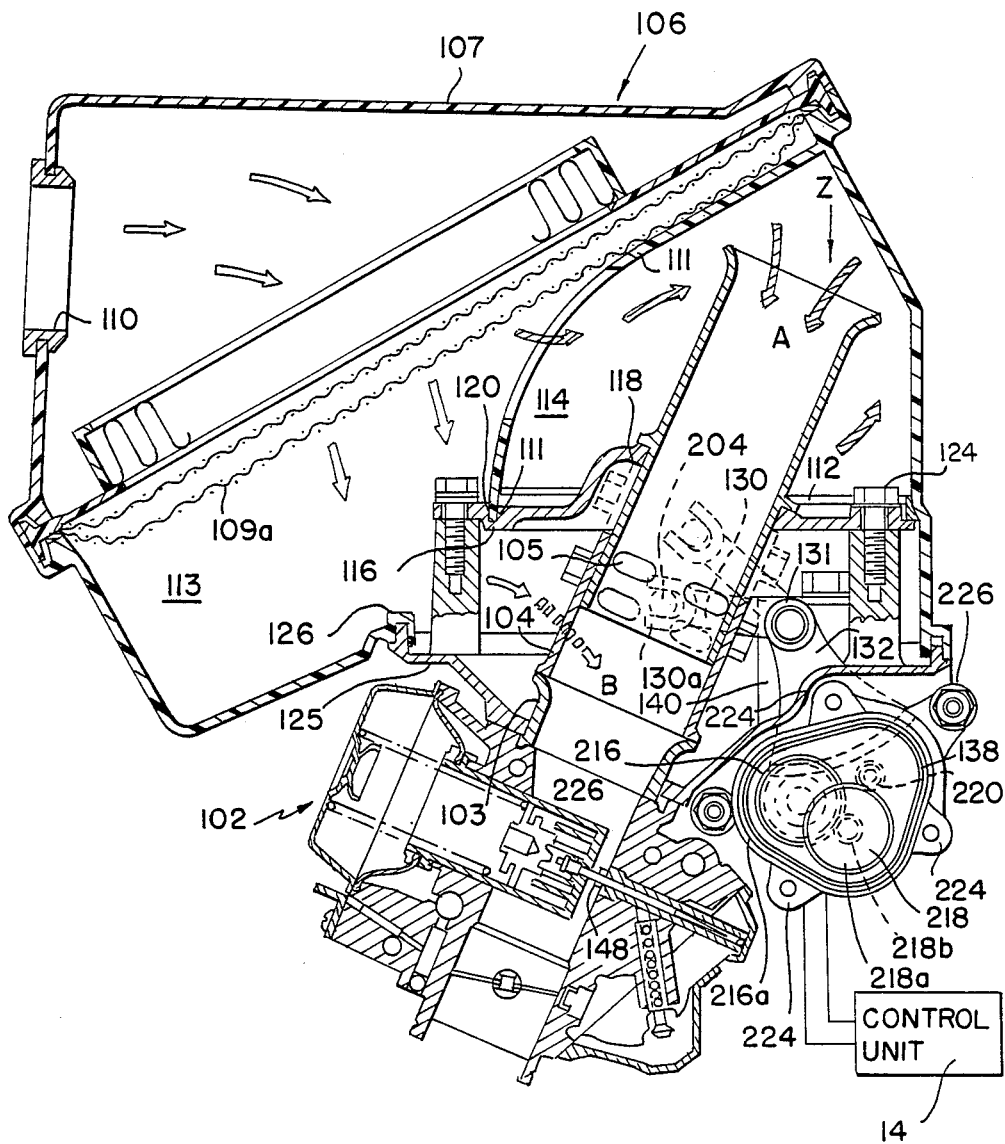
FIG. 29 is a sectional side view of an induction system according to still another preferred embodiment of the present invention.
Figure 30:
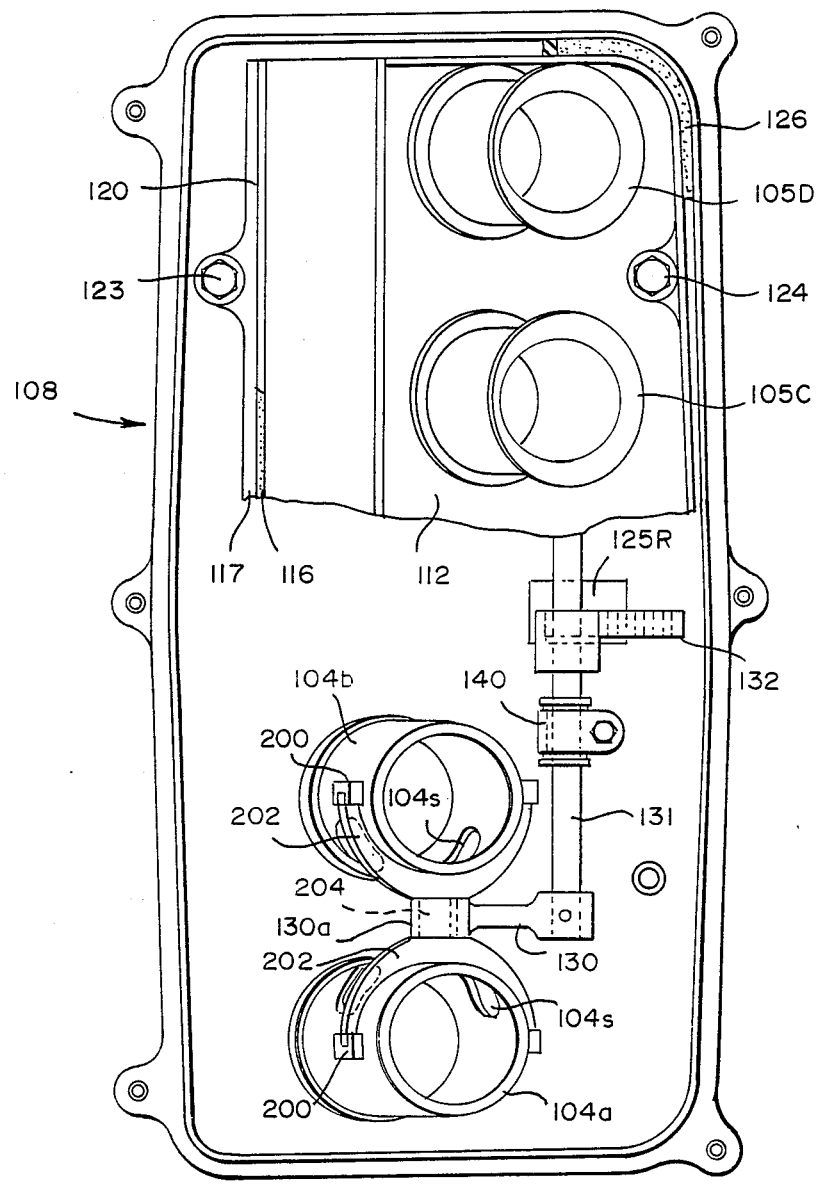
FIG. 30 is a partial sectional view illustrating the inside of an air cleaner case of the induction system of FIG. 2 as viewed in a direction indicated by the arrow marked Z.
Figure 31:
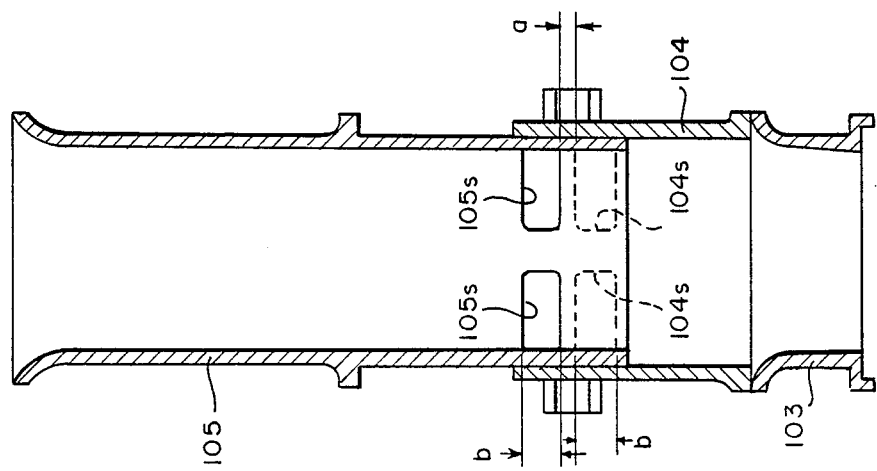

FIGS. 29 and 31 illustrate the preferred embodiment when configured in a low speed running mode where the slide valve or moveable intake pipe 104 is positioned at its lowermost position in FIG. 29 so as to contact the fixed intake pipe 103 to provide a long intake tract for the carburetor 102. As illustrated in FIG. 31, the slits 104S of the moveable intake pipe 104 and the slits 105S of the guide pipe 105 do not exhibit any overlap and are separated by the spacing A as illustrated in FIG. 31.

Figure 33:
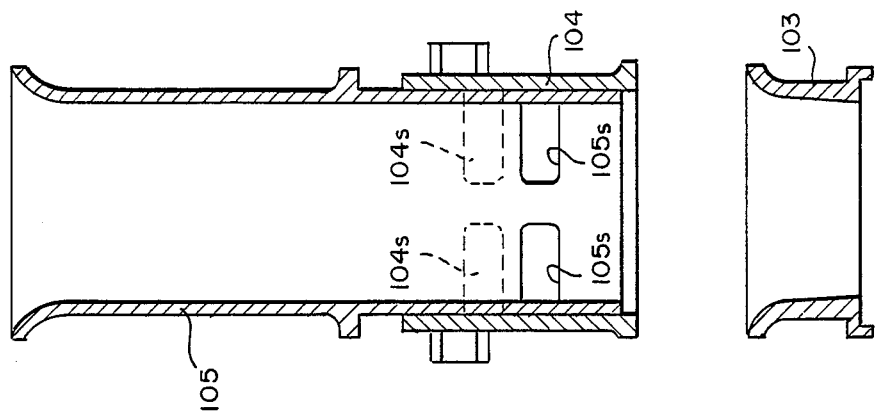
FIGS. 31-33 are schematic sectional detail views illustrating the relationship and overlap between the stationary intake pipe, moveable intake pipe, and guide pipe of the embodiment of FIG. 29.
Figure 32:
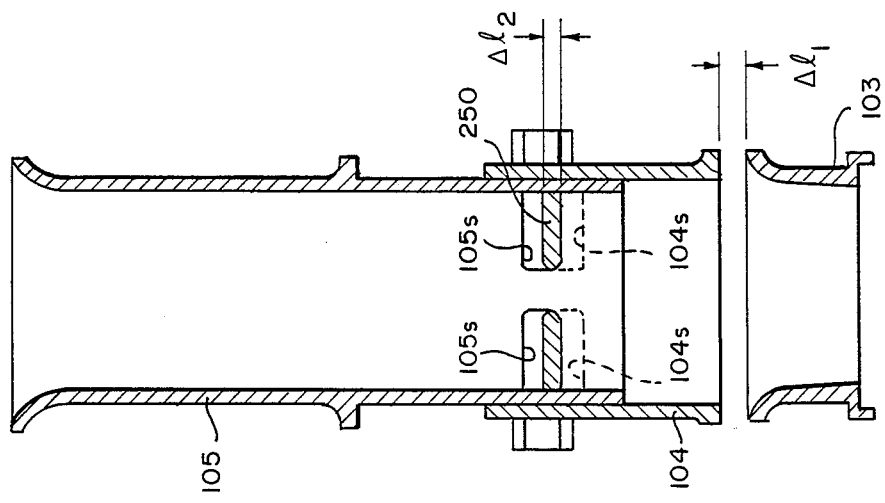

When the engine speed increases to above a predetermined speed, the induction system of the present invention shifts from the low speed mode to the high speed mode by shifting the moveable intake pipe 104 away from the fixed intake pipe 103 to shorten the effective intake tract length. During the transient period where the moveable intake pipe 104 is moving from its abutment to the fixed intake pipe 103 to a position fully spaced away from the fixed intake pipe 103 as illustrated in FIG. 33, a gap is increasingly formed between the fixed intake pipe 103 and the moveable intake pipe 104 as illustrated in FIG. 32. As this gap reaches the predetermined spacing $\Delta l_1$, the slits 104S of the moveable intake pipe 104 and 105S of the guide pipe 105 overlap each other so that a gap 250 illustrated in shading is provided at an intermediate portion of the intake tract.

In the present explanation, the distance between the slits 104S and 105S is represented as A and the width of the slits 104S, 105S is represented as B as illustrated in FIG. 3. The dimension of the gap between the moveable intake pipe or slide valve 104 and the stationary intake pipe 103 is defined as $\Delta l_1$ while the gap 250 produced by the overlapping slits 104S,105S is defined as $\Delta l_2$ as illustrated in FIG. 32. The total gap is represented as $\Delta l$ which is equal to $\Delta l_1 = \Delta l_2$. The relationships between $\Delta l_1$ and $\Delta l_2$ are shown in table 1 as follows.

TABLE 1

| | (unit: mm) | |
|---|---|---|
| $\Delta l_1$ | $\Delta l_2$ | $\Delta l$ |
| 0 | 0 | 0 |
| a | 0 | a |
| a + 1 | 1 | a + 2 |
| a + 2 | 2 | a + 4 |
| a + 3 | 3 | a + 6 |
| a + 4 | b | a + b + 4 |
| a + 5 | 3 | a + 8 |
| . | . | . |
| . | . | . |
| . | . | . |

Figure 28:
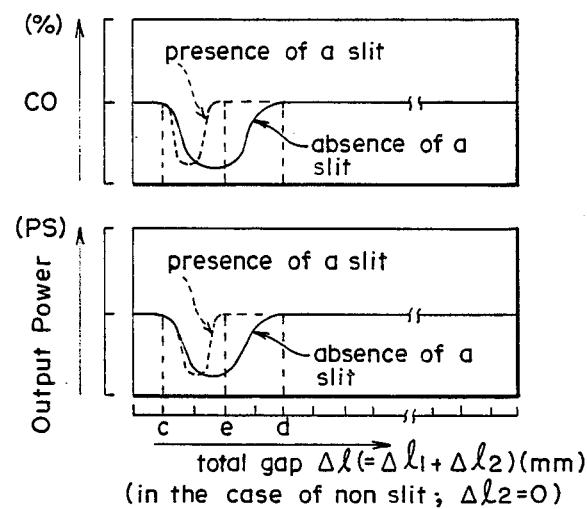
FIG. 28 is a graphical representation illustrating a fuel condition and the output power of an internal combustion engine in relationship to the total gap developed between the moveable induction tube and the fixed induction tube.

Accordingly, when the range in which a bad fuel condition appears without the slits 104S and 105S is, for example, $c(mm) \leq \Delta l = \Delta l_2 \leq d(mm)$ as illustrated in FIG. 28 and a slit having the width b(mm) is formed, $\Delta l_2$ is added to $\Delta l_1$ so that the range is changed to $c(mm) \leq \Delta l_1 = \Delta l_1 + \Delta l_2 \leq e(mm)$. Thus, in order for $\Delta l$ to change from c(mm) to d(mm), it is necessary for $\Delta l_1$ to change from c(mm) to e(mm).

In other words, where the slide valve or moveable intake pipe 104 operates at a fixed speed, the time at which the poor fuel condition exists is shortened due to the presence of the slits 104S, 105S as compared with the absence of these slits. In particular, as $\Delta l_2$ is added, an effect similar to that of increasing the sliding speed of the slide valve or moveable intake pipe 104 is provided so that the speed of formation of the total gap $\Delta l_1$ rises. Accordingly, the changes of the fuel condition and the output power are indicated by the broken lines of FIG. 1. The appearance of the intake tract during this transient period is illustrated in FIG. 32.

When the high speed running condition is fully reached, the intake tract appears as illustrated in FIG. 33. The high speed running condition is reached when the rotational speed of the internal combustion engine exceeds a predetermined rotational speed and the servo motor 138 fully shifts the moveable intake pipe 104 to its fully opened position. In this high speed running steady state condition of the intake tract, the slits 104S of the moveable intake pipe 104 and the slits 105S of the stationary intake pipe 105 are fully spaced apart so that no overlap exists therebetween. These slits therefore do not operate to pass air therebetween during the high speed mode of operation.

The present invention is not limited to the above described embodiments but can also be applied to various other configurations. For example, the air cleaner case need not be used for the case in housing the inlet tract and a separate case may be provided. The air flow resistance adjusting means may be embodied by both the variable throttle device such as the shutter as shown in the embodiments or a fixed throttle structure such as shown in other embodiments. When employing the fixed throttle structure, a plurality of intake passages having different air flow resistance may be constructed by the interior of the case or by many cases. These intake passages may be selectively connected to the required intake pipe by suitable switching means such as a valve mechanism.

The teachings of the present invention further enable the combination of the teachings of various embodiments. For example, the moveable intake pipe 104 shifting mechanism employed by the embodiment of FIGS. 24–27 may be employed in conjunction with the fitting of slits in the moveable intake pipe 104 and guide pipe 105 so as to further reduce the power drop during the transient condition between the high speed mode and low speed mode. Further, either or both of these mechanisms may be employed in a system such as that illustrated in FIG. 1.

Although the present invention has been described in its preferred form, it should be understood that the preferred embodiments of the present invention are not limiting. The scope of the present invention, instead, should be defined solely by the appended claims. Accordingly, changes and modifications in the construction, combination and arrangement of parts of the preferred embodiments may be resorted to without departing from the spirit and scope of the invention defined solely by the appended claims.

We claim:

1. An intake system for an internal combustion engine having at least one intake port for receiving a charge mixture and mixture development means for preparing said charge mixture, said intake system supplying air thereto and comprising:
    a relatively short fixed intake pipe forming a high speed inlet tract tuned for high engine speed operation, said fixed intake pipe having a high speed intake opening;
    a guide pipe separated from said intake opening of said fixed intake pipe and having an intake tract terminating in a low speed intake opening;
    a moveable intake pipe movably mounted on said guide pipe so as to selectively abut said fixed intake pipe to collectively form a low speed inlet tract with said fixed intake pipe and said guide pipe, said low speed inlet tract being tuned for low engine speed operation; and
    air flow resistance control means for varying the resistance of said intake system in response to movement of said moveable intake pipe.

2. The intake system of claim 1 wherein said mixture development means is a carburetor.

3. The intake system of claim 1 wherein said fixed intake pipe, moveable intake pipe and guide pipe collectively form a variable length intake tract;
    said air flow resistance control means including a housing surrounding said variable length intake tract, said housing having at least a high speed chamber provided with a high speed chamber inlet and a low speed chamber having a low speed chamber inlet;
    said high speed intake opening communicating with said high speed chamber, said low speed intake opening communicating with said low speed chamber,
    said low speed chamber inlet being more restrictive than said high speed chamber inlet thereby causing a variation in air flow resistance in response to movement of said moveable intake pipe.

4. The intake system of claim 3 wherein said low speed chamber inlet is provided between said high speed chamber and said low speed chamber.

5. The intake system of claim 4 wherein said high speed chamber inlet is provided between said high speed chamber and an atmosphere.

6. The intake system of claim 5 wherein an air filter is positioned across said high speed chamber intermediate between said high speed chamber inlet and said high speed intake opening and said low speed chamber inlet.

7. The intake system of claim 3 wherein said low speed chamber inlet and said high speed chamber inlet both communicate with an atmosphere.

8. The intake system of claim 6 wherein said mixture development means is a carburetor.

9. The intake system of claim 1 wherein said fixed intake pipe, moveable intake pipe and guide pipe collectively form a variable length intake tract;
    said air flow resistance control means including,
        a housing surrounding said variable length intake tract and having a housing air inlet, and
        variable inlet damper means for varying the air flow resistance through said housing air inlet.

10. The system of claim 9 wherein said variable inlet damper means includes a hinged damper door.

11. The system o claim 9 wherein said variable inlet damper means includes a sliding damper door.

12. The system of claim 1 wherein said mixture development means comprises a variable fuel adjusting carburetor, said intake system further comprising means for selectively varying the mixture produced by said variable fuel adjusting carburetor in cooperation with movement of said moveable intake pipe.

13. An intake system for an internal combustion engine having at least one intake port for receiving a charge mixture and mixture development means for preparing said charge mixture, said intake system supplying air thereto and comprising:
    a relatively short fixed intake pipe forming a high speed inlet tract tuned for high engine speed operation, said fixed intake pipe having a high speed intake opening;

a guide pipe separated from said intake opening of said fixed intake pipe and having an intake tract terminating in a low speed intake opening;

a moveable intake pipe movably mounted on said guide pipe so as to selectively abut said fixed intake pipe to collectively form a low speed inlet tract with said fixed intake pipe and said guide pipe, said low speed inlet tract being tuned for low engine speed operation;

said moveable intake pipe moving from a low speed position spaced away from said fixed intake pipe to a high speed position in abutment with said fixed intake pipe, said internal combustion engine being susceptible to a transient power drop during movement of said moveable intake pipe through positions intermediate therebetween; and transient power drop reduction means for reducing at least the duration of transient power drop relative to the speed of movement of said moveable intake pipe.

14. The system of claim 13 wherein said transient power drop means comprises slit means opening only during intermediate positions of said moveable intake pipe for increasing the speed of the change in air flow within the inlet tract.

15. The system of claim 13 wherein said transient power drop means comprises a first slit provided in said moveable intake pipe and a second slit provided in said guide pipe, said first and second slits overlapping to allow air to pass therethrough only during intermediate positions of said moveable intake pipe.

16. The system of claim 15 wherein said first and second slits do not overlap in said high speed position or said low speed position of said moveable pipe.

17. The system of claim 13 further comprising:
air flow resistance control means for varying the resistance of said intake system in response to movement of said moveable intake pipe.

18. The intake system of claim 13 wherein said mixture development means is a carburetor.

19. The intake system of claim 13 wherein said fixed intake pipe, moveable intake pipe and guide pipe collectively form a variable length intake tract;

said air flow resistance control means including a housing surrounding said variable length intake tract, said housing having at least a high speed chamber provided with a high speed chamber inlet and a low speed chamber having a low speed chamber inlet, said high speed intake opening communicating with said high speed chamber, said low speed intake opening communicating with said low speed chamber, said low speed chamber inlet being more restrictive than said high speed chamber inlet thereby causing a variation in air flow resistance in response to movement of said moveable intake pipe.

20. The intake system of claim 19 wherein said low speed chamber inlet is provided between said high speed chamber and said low speed chamber.

21. The intake system of claim 20 wherein said high speed chamber inlet is provided between said high speed chamber and an atmosphere.

22. An intake system for a multi-cylinder combustion engine having at least two intake ports for receiving a charge mixture and mixture development means for preparing said charge mixture, said intake system supplying air thereto and comprising:

a purality of relatively short fixed intake pipes, a fixed intake pipe being associated with each engine cylinder and forming a high speed inlet tract tuned for high engine speed operation, each said fixed intake pipe having a high speed intake opening;

a plurality of guide pipes, a guide pipe being associated with each engine cylinder and being separated from said intake opening of its associated said fixed intake pipe and having an intake tract terminating in a low speed intake opening;

a plurality of moveable intake pipes, a moveable intake pipe being associated with each engine cylinder and being moveably mounted on its associated said guide pipe so as to selectively abut its associated said fixed intake pipe to collectively form a low speed inlet tract with said fixed intake pipe and said guide pipe, said low speed inlet tract being tuned for low engine speed operation;

drive means for shifting each of said moveable intake pipes between said high speed position and said low speed position, said drive means differentially driving said moveable intake pipes of different cylinders with slightly different timings so that the transient power drop associated with different said cylinders occurs at slightly different times to reduce the total transient power drop at any given time occurring in said multi-cylinder engine.

23. The intake system of claim 22 wherein said multi-cylinder internal combustion engine is an in-line four cylinder engine having first and second adjacent cylinder pairs, said drive means shifting the moveable intake pipes associated with said first and second cylinder pairs at slightly different times.

24. The system of claim 22 wherein said mixture development means includes a carburetor associated with each said cylinder.

25. The system of claim 22 further comprising:
air flow resistance control means for varying the resistance of said intake system in response to movement of said moveable intake pipe.

26. The intake system of claim 25 wherein said fixed intake pipes, moveable intake pipes and guide pipes collectively form a variable length intake tract associated with each cylinder;

said air flow resistance control means including a housing surrounding said variable length intake tracts, said housing having at least a high speed chamber provided with a high speed chamber inlet and a low speed chamber having a low speed chamber inlet;

said high speed intake opening communicating with said high speed chamber, said low speed intake opening communicating with said low speed chamber, said low speed chamber inlet being more restrictive than said high speed chamber inlet thereby causing a variation in air flow resistance in response to movement of said moveable intake pipe.

27. The intake system of claim 26 wherein said low speed chamber inlet is provided between said high speed chamber and said low speed chamber.

28. The system of claim 22 further comprising:
transient power drop reduction means for reducing at least the duration of transient power drop relative to the speed of movement of said moveable intake pipes, said transient power drop means including slit means opening only during intermediate positions of said moveable intake pipe for increasing the speed of the change in air flow within the inlet tract.

29. The system of claim 28 wherein said slit means comprises a first slit provided in each said moveable intake pipe and a second slit provided in each said guide pipe, said first and second slits overlapping to allow air to pass therethrough only during intermediate positions of said moveable intake pipes.

30. An intake system for a multi-cylinder internal combustion engine having a plurality of intake ports for receiving a charge mixture and mixture development means for preparing said charge mixture, said intake system supplying air to said internal combustion engine via said mixture development means, comprising:
   variable length intake tract means for providing an adjustable effective length intake tract tuned to the rotational speed of said engine for each said cylinder;
   said variable length intake tract means developing a transient power drop in each said cylinder during adjustment of the effective length of said intake tract; and
   drive means for adjusting the effective length of the intake tract, said drive means varying the timing of the adjustment of effective length between different said cylinders so that the transient power drop associated with different said cylinders occurs at different times to reduce the total transient power drop in said multi-cylinder engine at any given time.

31. The intake system of claim 30 wherein said multi-cylinder internal combustion engine is an in-line four cylinder engine having first and second adjacent cylinder pairs, said drive means adjusting this effective intake tract length of associated with the cylinders of said first and second cylinder pairs at slightly different times.

32. The system of claim 30 wherein said mixture development means includes a carburetor associated with each said cylinder.

33. The system of claim 30 further comprising:
   air flow resistance control means for varying the resistance of said intake system in response to effective length of the induction tracts developed by said variable length intake tract means.

34. A charge supply system for an internal combustion engine having at least one intake port for receiving a charge mixture comprising:
   a carburetor supplying mixture to said intake port;
   variable length intake tract means for supplying intake air to said carburetor and for providing an adjustable effective length intake tract tuned to the rotational speed of said engine;
   air flow resistance control means for varying the resistance of said charge system to vary the mixture supplied by said carburetor and responding to the effective length of said intake tract as provided by said variable length intake tract means.

35. A method of supplying charge to an internal combustion engine to improve the performance thereof, the internal combustion engine having at least one intake port for receiving a charge mixture and a carburetor mounted to said input port said method comprising:
   (a) supplying charge to the engine with a carburetor mounted to said intake port;
   (b) varying the effective length of the intake tract providing air to said intake port through said carburetor to enhance the performance of said engine; and
   (c) varying the air flow resistance of the intake system including said carburetor and intake tract in conjunction with said step (b) to correct the air/fuel ratio provided to said intake port by said carburetor to reduce the influence of positive pressure waves on said air/fuel ratio.

\* \* \* \* \*